(12) United States Patent
Wischnewskiy et al.

(10) Patent No.: US 9,729,086 B2
(45) Date of Patent: Aug. 8, 2017

(54) ULTRASONIC ACTUATOR

(71) Applicant: Physik Instrumente GmbH & Co. KG, Karlsruhe (DE)

(72) Inventors: Wladimir Wischnewskiy, Rathenow (DE); Alexej Wischnewskiy, Wörth (DE)

(73) Assignee: Physik Instrumente GmbH & Co. KG, Karlsruhe (DE)

( * ) Notice: Subject to any disclaimer, the term of this patent is extended or adjusted under 35 U.S.C. 154(b) by 448 days.

(21) Appl. No.: 14/377,767

(22) PCT Filed: Feb. 4, 2013

(86) PCT No.: PCT/DE2013/100037
§ 371 (c)(1),
(2) Date: Aug. 8, 2014

(87) PCT Pub. No.: WO2013/117189
PCT Pub. Date: Aug. 15, 2013

(65) Prior Publication Data
US 2015/0042209 A1 Feb. 12, 2015

(30) Foreign Application Priority Data

Feb. 8, 2012 (DE) .......... 10 2012 201 863

(51) Int. Cl.
*H02N 2/04* (2006.01)
*H02N 2/00* (2006.01)
(Continued)

(52) U.S. Cl.
CPC .............. *H02N 2/04* (2013.01); *H02N 2/007* (2013.01); *H02N 2/026* (2013.01); *H02N 2/103* (2013.01)

(58) Field of Classification Search
CPC .............................. H02N 2/026; H02N 2/103
(Continued)

(56) References Cited

U.S. PATENT DOCUMENTS

| | | | | |
|---|---|---|---|---|
| 5,877,579 A | * | 3/1999 | Zumeris ............. | G11B 7/08576 310/317 |
| 6,765,335 B2 | * | 7/2004 | Wischnewskiy .... | H01L 41/0986 310/323.02 |
| 6,979,934 B1 | * | 12/2005 | Wischnewskiy .... | H01L 41/0913 310/323.01 |

FOREIGN PATENT DOCUMENTS

| | | |
|---|---|---|
| DE | 19522072 C1 | 2/1997 |
| DE | 19636827 C1 | 4/1998 |

(Continued)

OTHER PUBLICATIONS

International Search Report (translated) for application No. PCT/DE2013/100037, dated Jul. 29, 2013, 2 pages.
(Continued)

*Primary Examiner* — Thomas Dougherty
*Assistant Examiner* — Karen B Addison
(74) *Attorney, Agent, or Firm* — Reising Ethington P.C.

(57) ABSTRACT

The invention relates to an ultrasonic actuator (2) with a polarization axis P, said actuator being made of a piezoelectric ceramic. The ultrasonic actuator (2) has a temperature expansion coefficient which is parallel to the polarization axis P and which differs from a temperature expansion coefficient that is perpendicular to the polarization axis P, and at least one friction element (8) is arranged on the ultrasonic actuator. The friction element (8) consists of an anisotropic monocrystal with temperature expansion coefficients which are different along the three crystal axes a, b, and c. The temperature expansion coefficient along a first of the three crystal axes is the lowest, and the temperature expansion coefficient along a second of the three crystal axes (Continued)

is the greatest. The friction element (8) is aligned relative to the ultrasonic actuator (2) such that the first crystal axis is parallel to the polarization axis P of the ultrasonic actuator (2), and the second crystal axis is perpendicular to the polarization axis P of the ultrasonic actuator (2). The invention additionally relates to an ultrasonic motor with an ultrasonic actuator of the aforementioned type.

15 Claims, 23 Drawing Sheets

(51) Int. Cl.
*H02N 2/02* (2006.01)
*H02N 2/10* (2006.01)

(58) Field of Classification Search
USPC .... 310/323.16, 323.01, 323.02, 366, 323.04, 310/323.09, 323.17, 317, 323.03, 323.05, 310/358

IPC .................... H02N 2/04, 2/02, 2/00, 2/12, 2/08, H02N 2/10; H01L 41/047, 41/22, 41/053, 41/08, 41/09, 41/04, 41/083

See application file for complete search history.

(56) References Cited

FOREIGN PATENT DOCUMENTS

| DE | 19926010 A1 | 12/2000 |
| DE | 102008026429 A1 | 12/2009 |
| EP | 2153476 B1 | 2/2010 |
| FR | 2819650 A1 | 1/2001 |
| JP | 11261127 A | 3/1998 |
| WO | WO 0113505 A1 | 2/2001 |

OTHER PUBLICATIONS

Written Opinion (translated) for application No. PCT/DE2013/100037, dated Jul. 29, 2013, 7 pages.

* cited by examiner

ULTRASONIC ACTUATOR

TECHNICAL FIELD

The invention relates to an ultrasonic actuator made of piezoelectric ceramic and a friction element disposed on the ultrasonic actuator. The invention also relates to an ultrasonic motor with one such ultrasonic actuator.

BACKGROUND

Ultrasonic motors in which the ultrasonic actuator comprises friction elements disposed on or fixed to the latter, for example, are known from publications U.S. Pat. Nos. 6,979,934 B1, 6,765,335 B2 and EP 2 153 476. In the case of these ultrasonic motors, the ultrasonic actuator is made completely of a lead-zirconate-titanate (PZT) ceramic. The friction elements are connected to the polarized ultrasonic actuator by means of an organic adhesive on an epoxy resin base. Furthermore, ultrasonic actuators which disclose the use of monocrystals as a material for the friction contact are known from publications DE 10 2008 026 429 A1 and DE 195 22 072 C1, whilst the use of monocrystals as a material for the oscillator is known from publications DE 199 26 010 A1 and JP 11261127 A.

The maximum operating temperature of the ultrasonic actuators is limited by the Curie point of the piezoceramic, which lies at over 300° C. for PZT ceramics. At the same time, the strength of the organic adhesive on an epoxy resin base is determined by the setting temperature of the adhesive. In the case of special adhesives, this can amount to up to 250° C.

In the ultrasonic motor, the friction element transmits the mechanical power of the ultrasonic actuator to the element to be driven. The total mechanical power to be transmitted to the element to be driven is therefore transmitted via the adhesive layer that connects the friction element to the ultrasonic actuator. As a result of the ultrasonic oscillations acting on the adhesive layer, the latter heats up.

If the temperature of the adhesive layer exceeds the setting temperature of the adhesive, this usually leads to a decomposition of the adhesive with accompanying serious changes in the properties, so that the friction element subsequently becomes detached from the ultrasonic actuator. The ultrasonic actuator thus becomes load-free, as a result of which its resistance is reduced by several powers of ten. This leads to destruction of the ultrasonic actuator and ultimately to a total failure of the ultrasonic motor.

The temperature increase in the adhesive layer is proportional to its thickness. It is therefore advantageous if the thickness of the adhesive layer is small. Thicknesses of the adhesive layer between 10 and 15 µm are common.

According to the applicant's in-house prior art, when the friction element is bonded with the piezoelectric actuator of the ultrasonic motor, both are heated up to the setting temperature of the adhesive. Cooling of the two elements then takes place. On account of large differences in the temperature expansion coefficients of the ultrasonic actuator and the friction element, large initial mechanical stresses are created in the region of the adhesive layer during cooling. These initial mechanical stresses are reduced or compensated for by the temperature increase usually arising during the operation of the ultrasonic actuator; the farther away the setting temperature of the adhesive lies from the average operating temperature of the motor, however, the higher the mechanical stresses.

In practice, it is almost impossible to select the setting temperature of the adhesive higher than 100° C. The initial mechanical stresses would be extremely high at a higher temperature. When the motor is switched on, the initial mechanical stresses and the mechanical stresses add up on account of the friction contact of the friction element and the element to be driven, as a result of which cumulative mechanical stresses would arise, the amplitude whereof would be so great that the piezoelement would explode or the adhesive layer would be directly destroyed.

On the other hand, it is also not practicable to increase the thickness of the adhesive layer to compensate for the difference in the temperature expansion of the piezoceramic and the friction element, since—as mentioned previously—the heating of the adhesive layer is proportional to its thickness.

The maximum operating temperature is therefore very restricted or limited with the ultrasonic actuators known from the applicant's in-house prior art and the associated ultrasonic motors.

SUMMARY

One of the problems addressed by the invention, therefore, is to provide an ultrasonic actuator and an ultrasonic motor equipped with the latter with a greater operating temperature range.

This problem is solved by an ultrasonic actuator according to claim 1 and by an ultrasonic motor according to claim 11. Advantageous developments of the ultrasonic actuator according to the invention and the ultrasonic motor according to the invention are the subject-matter of the sub-claims.

The piezoceramic material is polarized in the case of the ultrasonic actuator according to the invention, so that a plurality of polarization vectors p running parallel to one another can be specified, which in their totality define a polarization direction which can be described by polarization axis P. With regard to polarization axis P, the piezoceramic material of the ultrasonic actuator has two different temperature expansion coefficients, i.e. a temperature expansion coefficient $\alpha_{II}$ parallel to polarization axis P, and a temperature expansion coefficient $\alpha_{\perp}$ differing therefrom and normal to polarization axis P, wherein $\alpha_{II}$ is less than $\alpha_{\perp}$.

The consequence of the difference in temperature expansion coefficients $\alpha_{II}$ and $\alpha_{\perp}$ is that, when heating occurs, the ultrasonic actuator expands to a lesser extent parallel to polarization axis P than normal thereto.

At least one friction element is disposed on the ultrasonic actuator, wherein the friction element is made of an anisotropic monocrystal with different temperature expansion coefficients along the three crystal axes a, b and c. The temperature expansion coefficient is least along a first of the three crystal axes and the temperature expansion coefficient is greatest along a second of the three crystal axes. The friction element of the ultrasonic actuator according to the invention is orientated with respect to the latter in such a way that the first crystal axis is disposed parallel to polarization axis P of the ultrasonic actuator and the second crystal axis is disposed normal to polarization axis P of the ultrasonic actuator. For the friction element, it is possible here to specify a polarization axis $P_2$, at which the friction element lies symmetrical with the latter and which represents the central polarization axis for the friction element.

The directions of minimum and maximum expansion coincide as a result of the previously described orientation of the friction element with respect to the ultrasonic actuator and a mutual approach of the corresponding temperature expansion coefficients takes place, so that the stresses caused by thermal effect in the interface or transition region between the friction element and the ultrasonic actuator are minimized.

It may be advantageous for the monocrystal of the friction element to have a rhombic crystalline structure and preferably to be made of yttrium aluminate ($YAlO_3$), chrysoberyl ($BeAl_2O_4$) or topaz $Al_2SiO_4(F,OH)_2$.

It may be advantageous here for crystal axis b of the friction element to be orientated parallel to polarization axis P of the ultrasonic actuator, and for crystal axis c of the friction element to be orientated normal to the surface of the ultrasonic actuator on which the friction element is disposed.

It may also be advantageous for the friction element to be made of lithium triborate ($LiB_3O_5$). In this case, it may be advantageous for crystal axis b of the friction element to be orientated parallel to polarization axis P of the ultrasonic actuator and for crystal axis c of the friction element to be orientated normal to the polarization axis of the ultrasonic actuator, whilst crystal axis a is orientated normal to the surface of the ultrasonic actuator on which the friction element is disposed.

Furthermore, it may be advantageous for the monocrystal of the friction element to have a hexagonal crystalline structure and preferably to be made of corundum, ruby, sapphire ($Al_2O_3$) or silicon carbide (SiC). In this case, it may be favorable for crystal axis c of the friction element to be orientated normal to polarization axis P of the ultrasonic actuator and for the plane formed by the two other crystal axes a and b to be orientated normal to the surface of the ultrasonic actuator on which the friction element is disposed.

It may be advantageous for the friction element to be provided with a thin hard abrasion-resistant external layer, preferably made of isotropic ceramic, sitall, glass or glass filled with hard metal particles.

It may prove to be favorable here for the abrasion-resistant external layer of the friction element to have a monolithic structure, or a structure in the form of straight or concentric or helical strips, or a network structure or a structure in the form of a field of dots with a square or other shape.

Moreover, it may be advantageous for the friction element to be connected to the ultrasonic actuator by means of an organic adhesive or a low-temperature glass.

The invention also relates to an ultrasonic motor with an ultrasonic actuator according to any one of the preceding claims and an element to be driven by the ultrasonic actuator.

It may prove to be favorable here for the element to be driven to comprise a friction rail, with which the friction element of the ultrasonic actuator is in an operative connection.

It may prove to be favorable for the friction rail to be made of a synthetic monocrystal of carbon of cubic crystalline structure, wherein crystal axis c of the monocrystal is disposed normal or parallel to the surface of the friction rail.

Furthermore, it may prove to be favorable for the friction rail to be made of a carbon monocrystal of cubic crystalline structure, preferably comprising zirconium oxide ($ZrO_2$), spinell ($MgAl_2O_4$), yttrium aluminum granate ($Y_3Al_5O_{12}$) or boron nitride (β-BN), wherein crystal axis a or crystal axis b or crystal axis c of the monocrystal is orientated normal to the surface of the friction rail.

Moreover, it may prove to be favorable for the friction rail to be made of a monocrystal of hexagonal crystalline structure, preferably comprising corundum, ruby or sapphire ($Al_2O_3$), wherein crystal axis c of the monocrystal is orientated normal or parallel to the surface of the friction rail.

Further advantageous developments of the invention emerge from combinations of the features disclosed in the claims, in the description and in the drawings.

DETAILED DESCRIPTION OF THE ILLUSTRATED EMBODIMENT(S)

Figure 1:
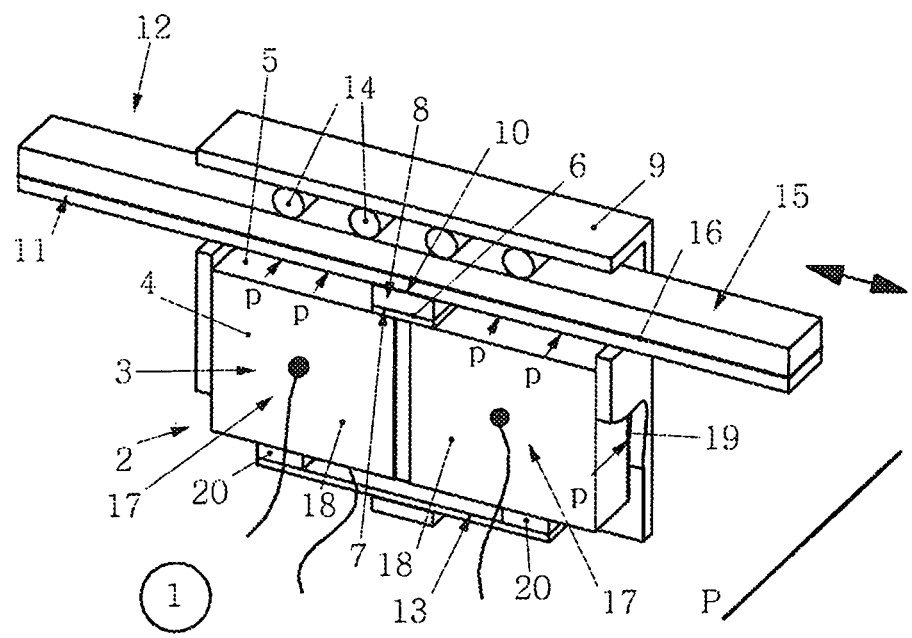
FIG. 1: Representations 1 and 2: embodiments of an ultrasonic motor
Figure 1:
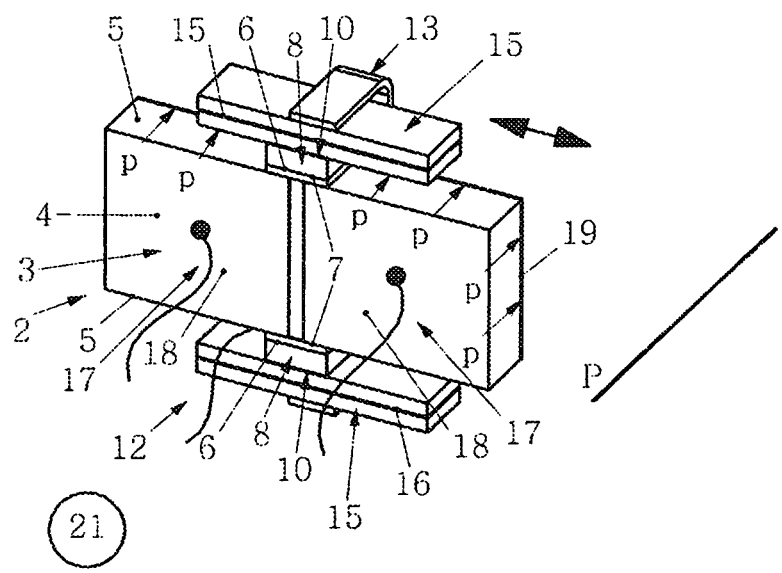

Representation 1 of FIG. 1 shows a possible embodiment of an ultrasonic motor with an ultrasonic actuator according to the invention. Ultrasonic actuator 2 made of piezoelectric ceramic has the shape of a plate 4. An adhesive 7 connects connection face 6 of friction element 8 with working face 5 of piezoelement 3.

Ultrasonic actuator 2 is disposed in a housing 9. Friction surface 10 of friction element 8 is pressed with a spring element 13 against friction rail 11 of element 12 to be driven in the form of a rectangular rod. Element 12 to be driven is mounted in a mobile manner with respect housing 9 by means of bearing elements 14.

Friction rail 11 is fixed by means of a sound-insulating layer 16 to base body 15 of element 12 to be driven. This makes it possible to improve the function of the friction contact of the ultrasonic motor. Sound-insulating layer 16 is a layer of a viscous organic adhesive. A viscous organic adhesive filled with hard particles of inorganic material can also be used for the sound-insulating layer. It is also conceivable for sound-insulating layer 16 to comprise rubber, silicone or polyurethane and preferably to be made therefrom.

Ultrasonic actuator 2 comprises generators 17 for regenerating an acoustic standing wave therein, wherein the generators comprise electrodes 18 and 19.

The piezoelectric ceramic of piezoelement 3 is polarized normal to electrodes 18 and 19, represented by vectors p. Polarization axis P, which runs parallel to vectors p, characterizes as their representative the polarization direction of the ultrasonic actuator.

Sound-insulating elements 20 decouple spring element 13 from ultrasonic actuator 2.

Representation 21 from FIG. 1 shows a further embodiment of an ultrasonic motor with an ultrasonic actuator according to the invention, on which two friction elements 8 are disposed on mutually opposite side faces of ultrasonic actuator 2, and two elements 12 to be driven are provided in a corresponding manner. Spring element 13 is present here as a clamp, which engages around both elements 12 to be driven and presses against friction elements 8.

Figure 2:
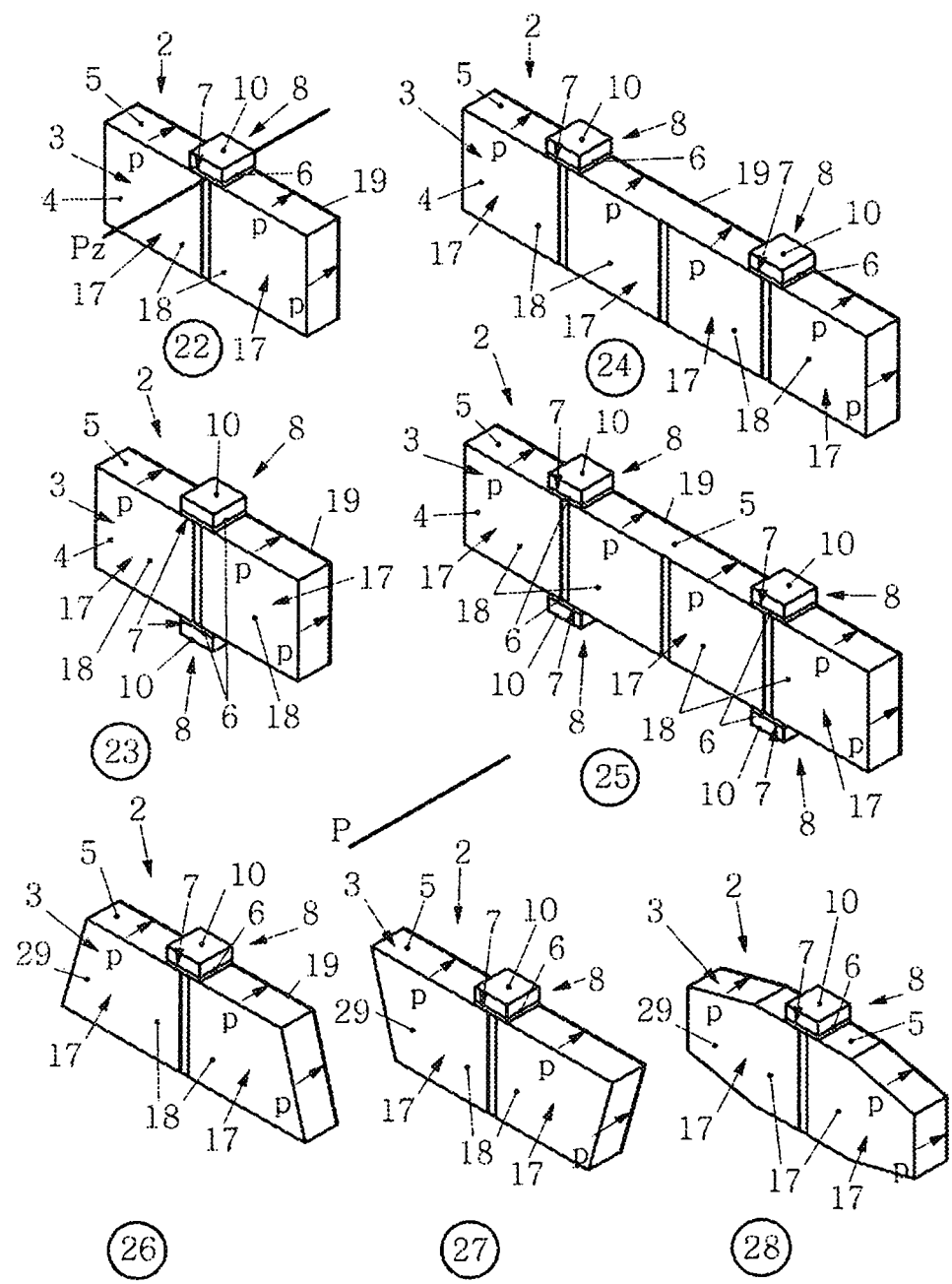
FIG. 2: Representations 22 to 28: different embodiments of a plate-shaped ultrasonic actuator

Representations 22 to 25 from FIG. 2 show ultrasonic actuator 2 according to the invention in the form of rectangular plates 4, whilst ultrasonic actuators 2 in the form of acute-angled plates are shown in representations 26 to 28. Representations 22 and 23 relate to ultrasonic actuators with in each case two generators 15, whilst the ultrasonic actuators of representations 24 and 25 comprise four generators. The ultrasonic actuator according to representation 22 comprises only one friction element 8 disposed on long side face or working face 5, and the ultrasonic actuator according to representation 23 comprises two friction elements disposed on mutually opposite long side faces or working faces 5. The ultrasonic actuator according to representation 24 comprises two friction elements, which are disposed on the same long side face or working face 5, whilst the ultrasonic actuator according to representation 25 comprises a total of four friction elements 8, whereof two are disposed an a long side face or working face 5 and two are disposed on correspondingly mutually opposite long side face or working face 5.

Figure 3:
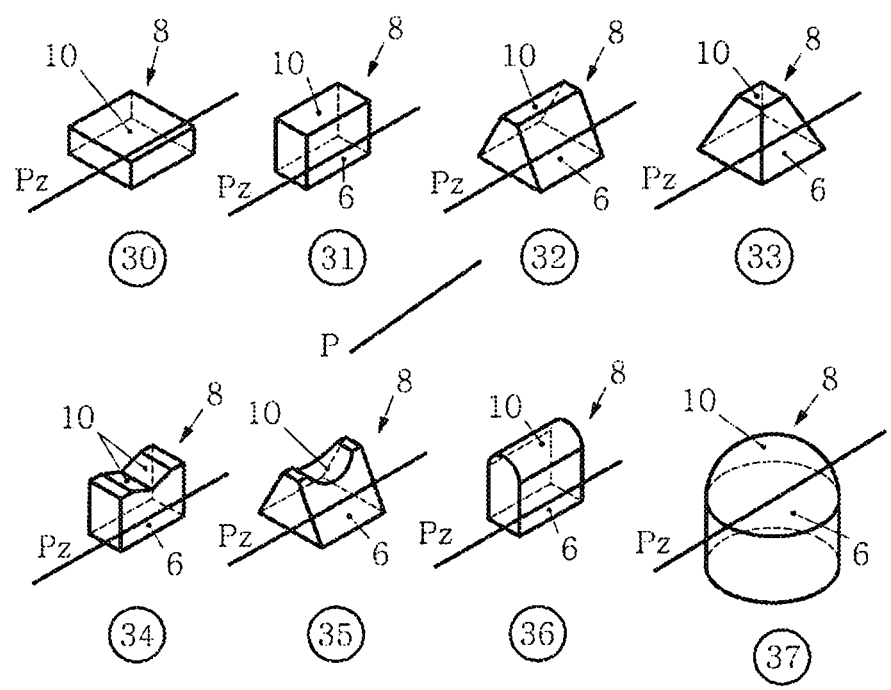
FIG. 3: Representations 30 to 37: different embodiments of a friction element

Representations 30 to 37 from FIG. 3 show possible embodiments of friction elements 8 of an ultrasonic actuator according to the invention. Whereas the friction elements according to representations 30 to 34 have the shape of prisms with plane friction faces 10, the friction elements according to representations 35 and 36 comprise cylindrical friction faces 10. Representation 37 from FIG. 3 shows a friction element with a spherical friction face 10.

Figure 4:
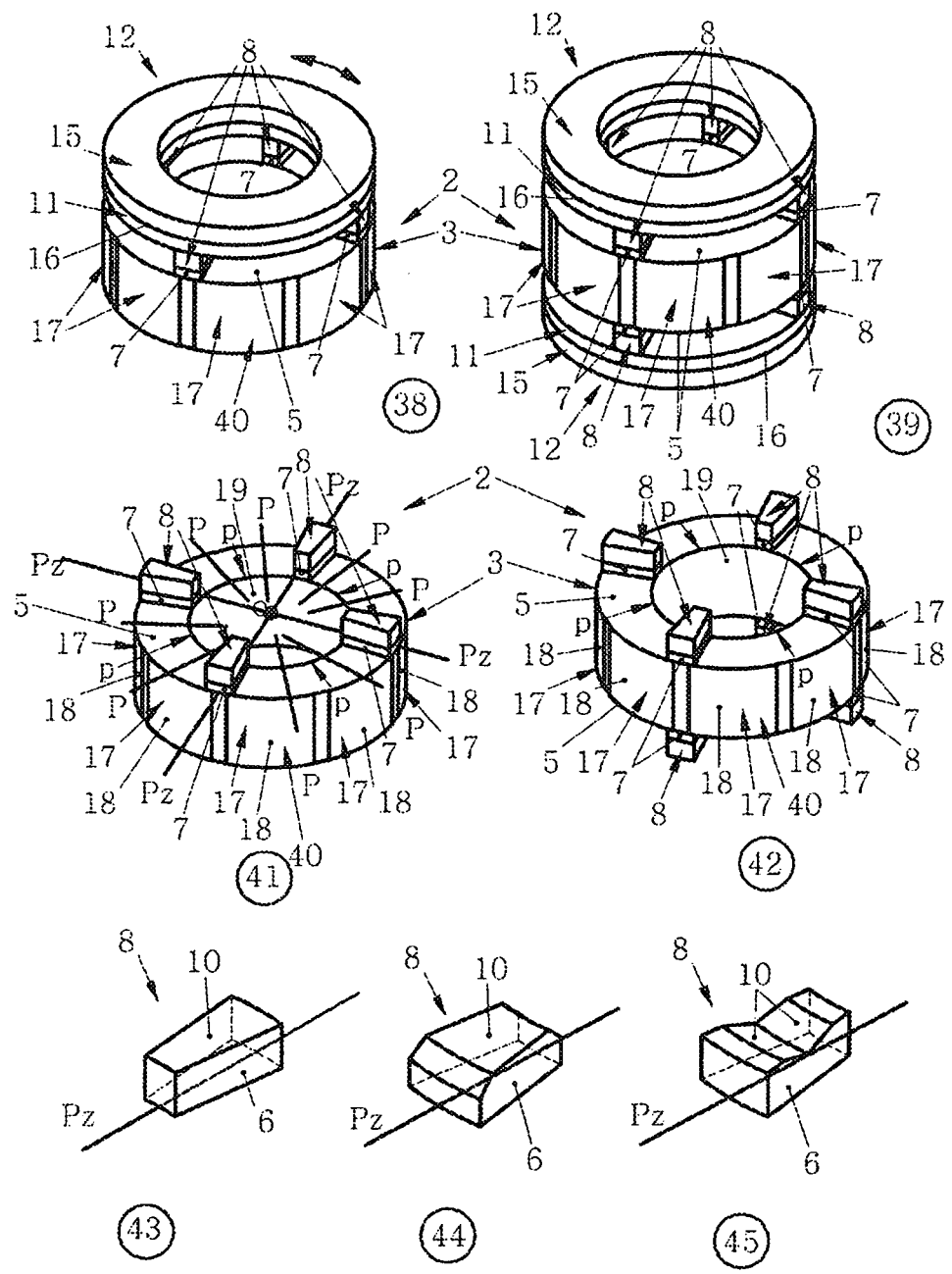
FIG. 4: Representations 38 and 39: embodiments of an ultrasonic motor; representations 41 to 43: details of the ultrasonic motors according to representations 38 and 39; representations 44 and 45: further embodiments of the friction element

Representations 38 and 39 from FIG. 4 show further embodiments of an ultrasonic motor, wherein piezoelement 3 of ultrasonic actuator 2 has a hollow-cylindrical shape, and friction elements 8 disposed on the ultrasonic actuator each represent a ring section.

The ultrasonic motor according to representation 38 comprises a ring-shaped element 12 to be driven, whilst the ultrasonic motor according to representation 39 comprises two ring-shaped elements 12 to be driven, said elements being disposed opposite one another. The elements to be driven are provided here with friction rails 11.

Representations 41 and 42 show, as a detail, ultrasonic actuators 2 of the ultrasonic motors according to representations 39 and 40. Ultrasonic actuators 2 are polarized radially here, so that a plurality of polarization axes P running radially and intersecting at centre point 0 are present (see representation 41 from FIG. 4).

Each friction element 8 is disposed on working face 5 of the ultrasonic actuator symmetrically with respect to one of polarization axes P, which represents central polarization axis $P_z$ for this friction element. Representations 43 and 45 from FIG. 4 show the arrangement of friction elements 8 with respect to their central polarization axes $P_z$.

Figure 5:
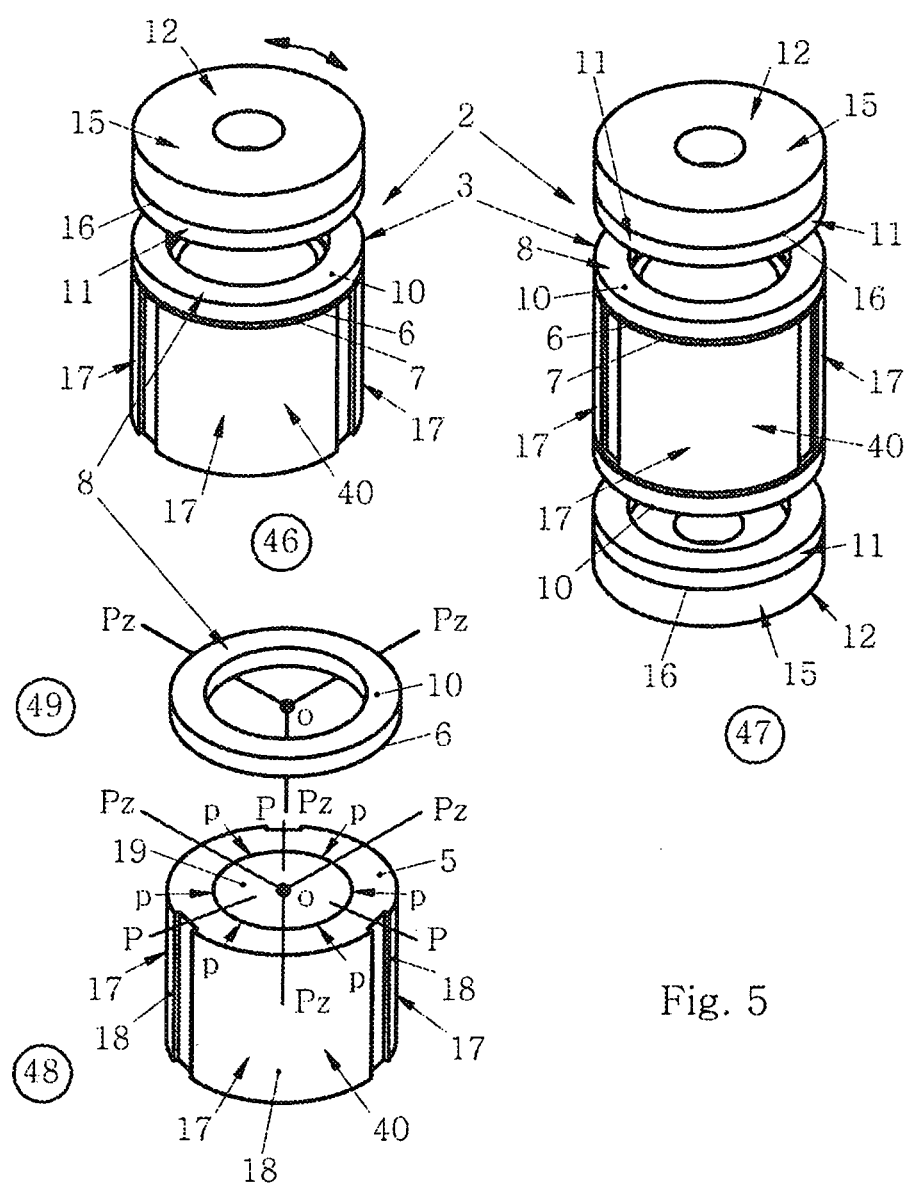
FIG. 5: Representations 46 and 47: embodiments of an ultrasonic motor with a hollow-cylindrical ultrasonic actuator; representations 48 and 49: details of the ultrasonic motors according to representations 46 and 47

Representations 46 and 47 from FIG. 5 shows further embodiments of ultrasonic motors, wherein the ultrasonic actuators have a hollow-cylindrical shape and friction elements 8 are ring-shaped. Representations 48 and 49 from FIG. 5 show, as a detail of the ultrasonic motor according to representation 46, the ultrasonic actuator and the friction element. Representations 48 and 49 illustrate the mutual position of polarization axes P and $P_z$ of the ultrasonic actuator and the friction element respectively.

Figure 6:
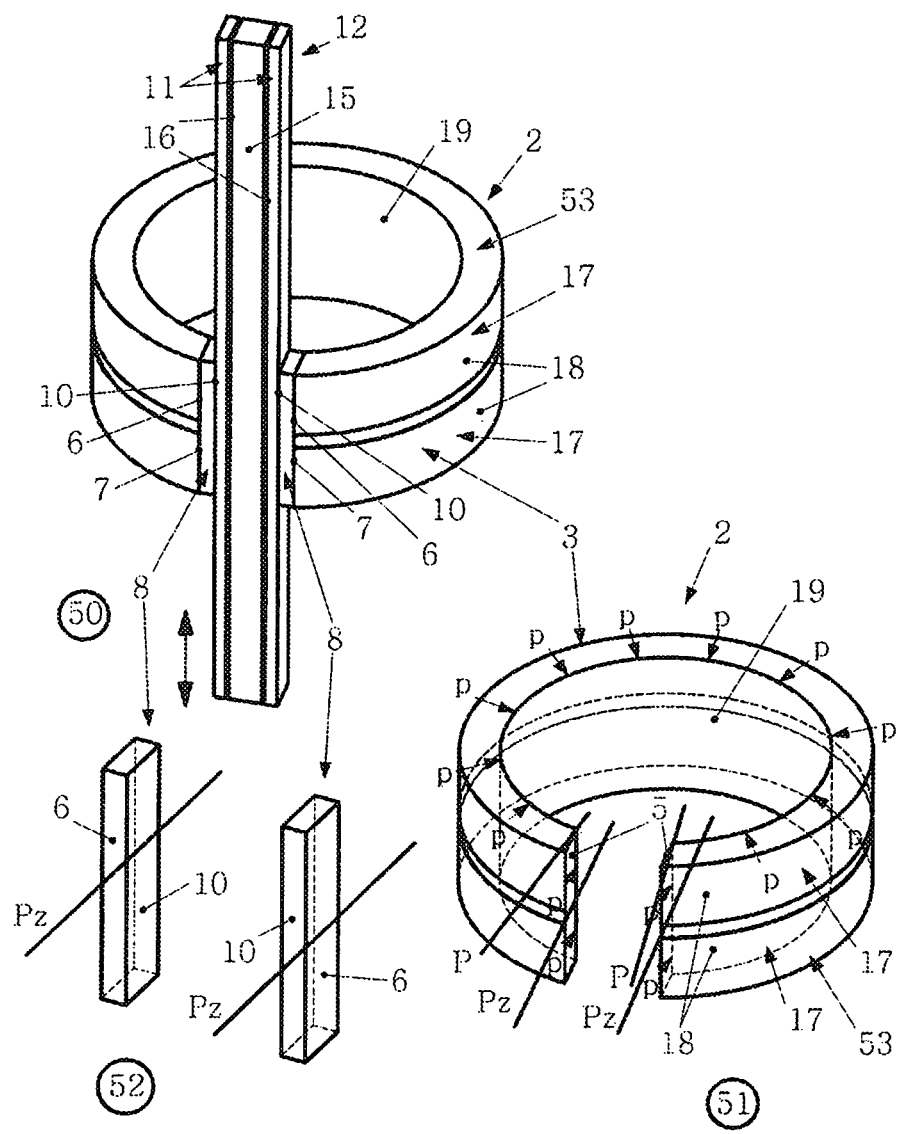
FIG. 6: Representation 50: embodiment of an ultrasonic motor with an ultrasonic actuator in the form of a partial hollow-cylindrical cylinder; representations 51 and 52: details of the ultrasonic motor according to representation 50

Representation 50 from FIG. 6 shows a further embodiment of an ultrasonic motor with an essentially hollow-cylindrical ultrasonic actuator, wherein a part parallel to the longitudinal axis of the hollow cylinder is cut out. Element 12 to be driven is inserted in the corresponding gap of the hollow cylinder.

Representations 51 and 52 from FIG. 6 show, as a detail of the ultrasonic motor from representation 50, ultrasonic actuator 2 and friction elements 8 disposed on the latter. In addition, representations 51 and 52 illustrate the mutual position of polarization axes P and $P_z$ of the ultrasonic actuator and the friction elements respectively.

Figure 7:
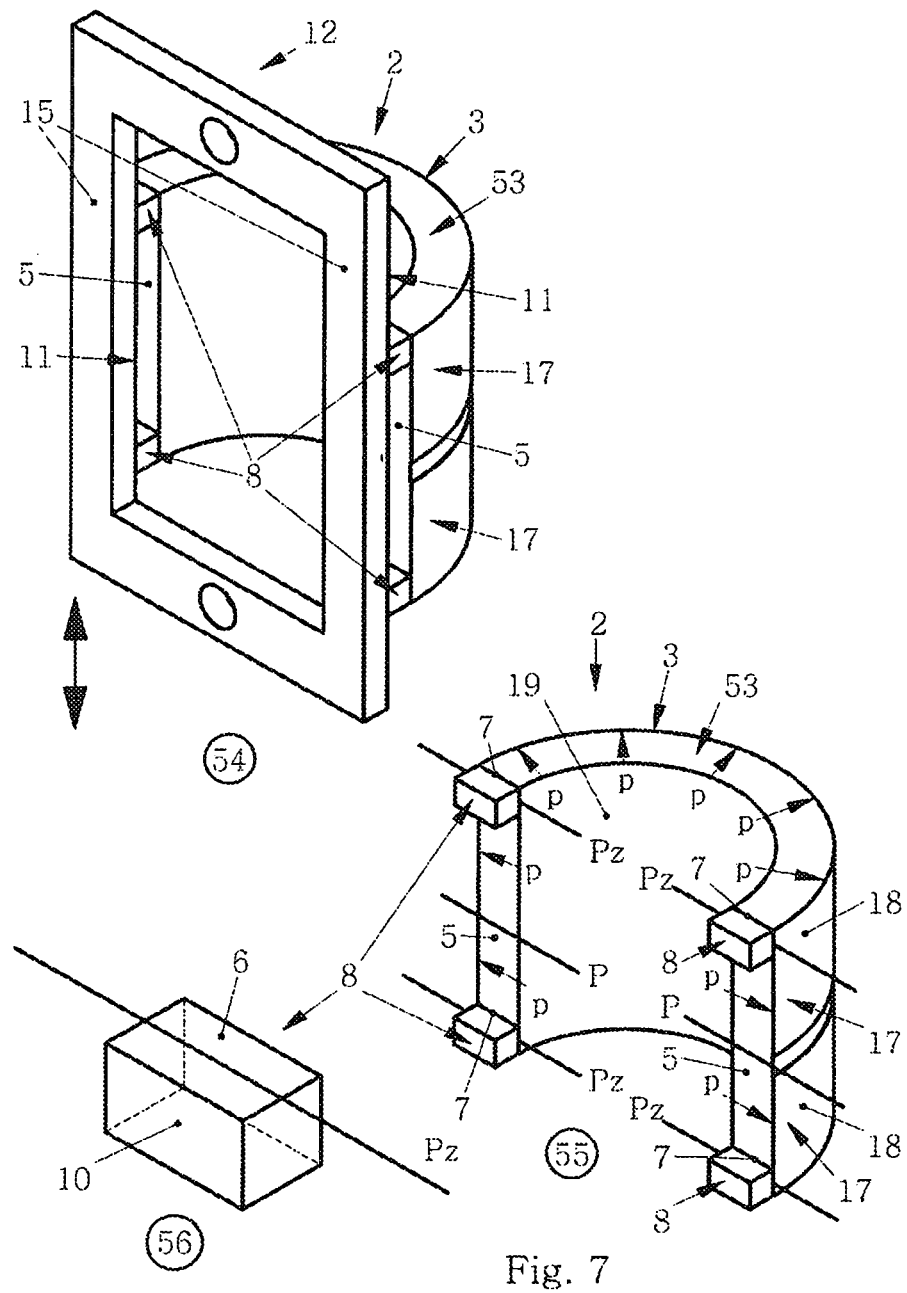
FIG. 7: Representation 54: further embodiments of an ultrasonic motor with an ultrasonic actuator in the form of a partial hollow-cylindrical cylinder; representations 55 and 56: details of the ultrasonic motor according to representation 54

FIG. 7 shows in representation 54 a further embodiment of an ultrasonic motor, wherein the ultrasonic actuator is also a partial hollow cylinder, wherein two friction elements 8 are disposed in each case on the corresponding end faces orientated normal to the circumferential direction.

Representations 55 and 56 from FIG. 7 show, as a detail of the ultrasonic motor of representation 54, ultrasonic actuator 2 and friction elements 8 disposed on the latter. In addition, representations 55 and 56 illustrate the mutual position of polarization axes P and $P_z$ of the ultrasonic actuator and the friction elements respectively.

Figure 8:
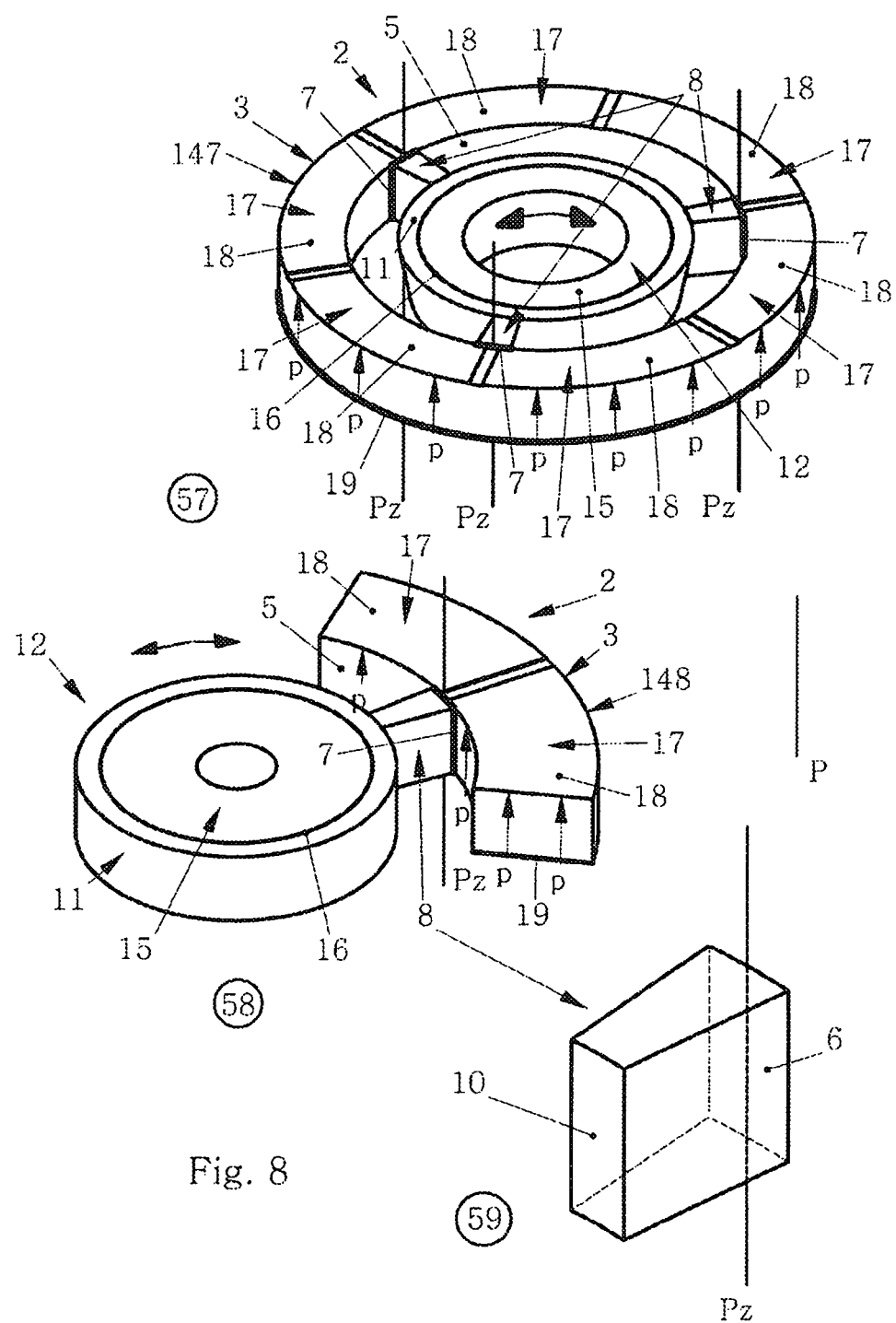
FIG. 8: Representations 57 and 58: embodiment of an ultrasonic motor with an ultrasonic actuator in the form of a ring or a partial ring; representation 59: friction element of the ultrasonic motors according to FIGS. 57 and 58

Representations 57 and 58 from FIG. 8 show further embodiments of ultrasonic motors, wherein the ultrasonic actuator has the shape of a ring (representation 57) and the shape of a partial ring (representation 58). Representation 59 from FIG. 8 shows, as a detail from representations 57 and 58, corresponding friction element 8 and illustrates the position of polarization axis $P_z$ thereon.

Figure 9:
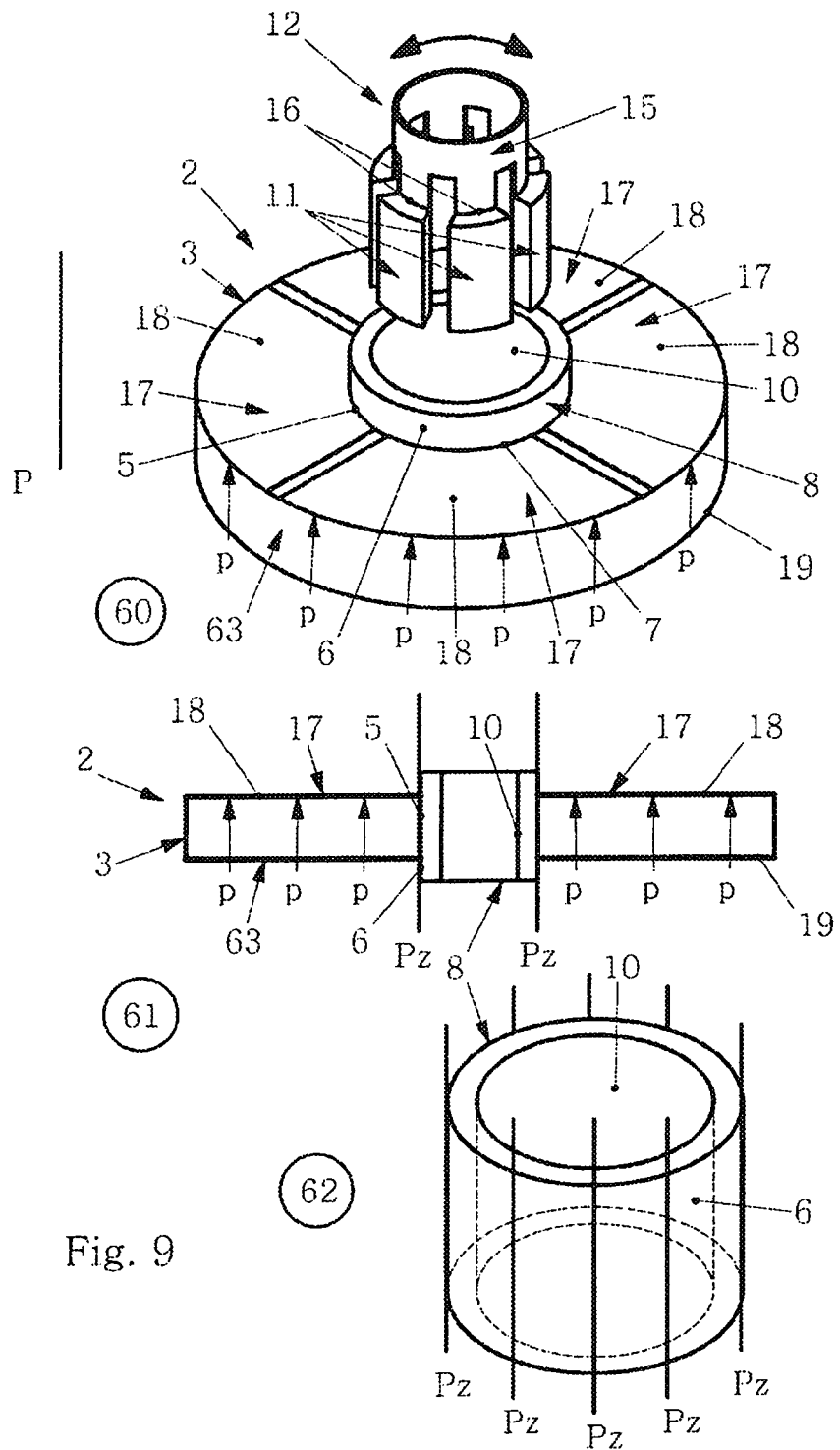
FIG. 9: Representation 60: embodiment of an ultrasonic motor with a disc-shaped ultrasonic actuator; representations 61 and 62: details of the ultrasonic motor according to representation 60

The ultrasonic motor according to representation 60 from FIG. 9 comprises an ultrasonic actuator in the shape of a thin disc 63, whilst friction element 8 of this motor is constituted as a thin-walled hollow cylinder and is disposed in the central opening of the ultrasonic actuator.

Representation 61 from FIG. 9 shows, as a detail of the ultrasonic motor according to representation 60 from FIG. 9, the ultrasonic actuator in a side view, whilst representation 62 from FIG. 9 shows friction element 8 as a detail of the ultrasonic motor according to representation 60.

Figure 10:
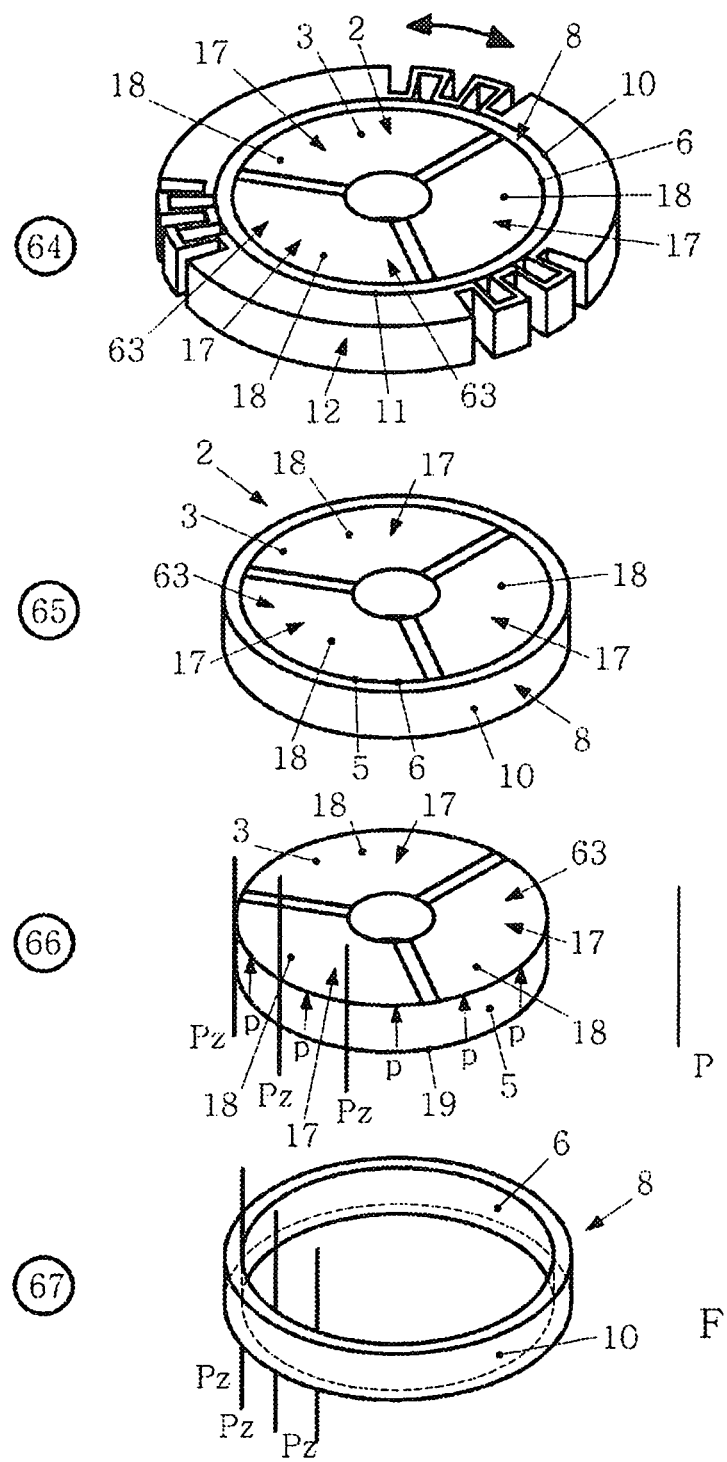
FIG. 10: Representation 64: further embodiment of an ultrasonic motor with a disc-shaped ultrasonic actuator; representations 65 to 67: details of the ultrasonic motor according to representation 64

The ultrasonic motor according to representation 64 from FIG. 10 comprises a disc-shaped ultrasonic actuator 2, which is surrounded externally by a friction element in the shape of a ring. Representation 65 from FIG. 10 shows, as a detail of representation 64, the ultrasonic actuator together with the friction element surrounding the latter. Representations 66 and 67 show, as a detail, the ultrasonic actuator (representation 66) and the friction element (representation 67) of the ultrasonic motor according to representation 64, wherein the mutual position of polarization axes P and $P_z$ is illustrated.

Figure 11:
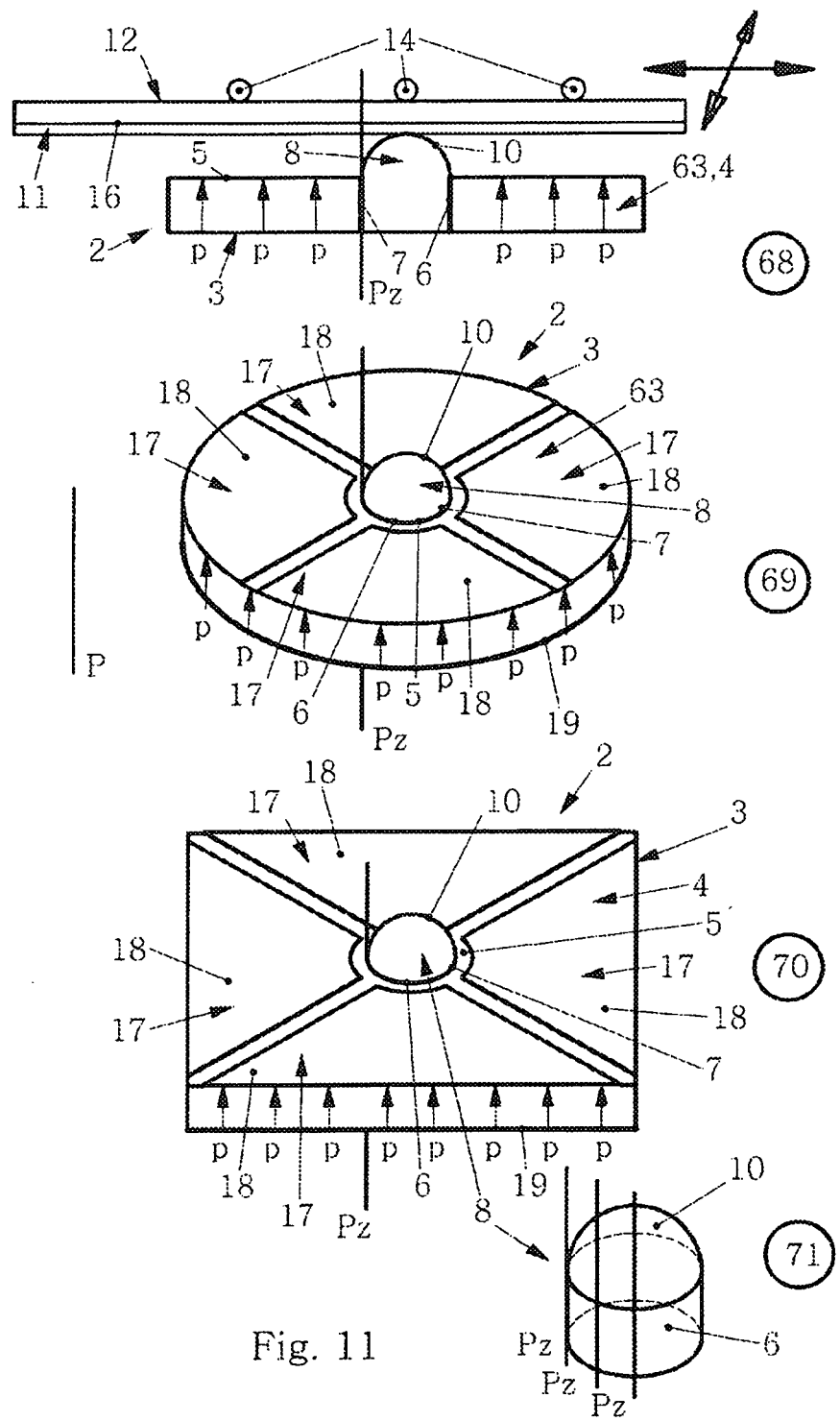
FIG. 11: Representation 68: further embodiment of an ultrasonic motor with a disc-shaped ultrasonic actuator; representation 69: ultrasonic actuator with an ultrasonic motor according to representation 68; representation 70: further embodiment of an ultrasonic actuator for the ultrasonic motor according to representation 68; representation 71: friction element of the ultrasonic actuators according to representations 69 and 70

In the case of the ultrasonic motor according to representation 68 from FIG. 11, a cylindrical friction element sits in a central opening of the ultrasonic motor. Representation 69 from FIG. 11 shows, as a detail, the disc-shaped ultrasonic actuator of the ultrasonic motor according to representation 68. Representation 70 from FIG. 11 shows an alternative form of the ultrasonic actuator for an ultrasonic motor according to representation 68 from FIG. 11 in the shape of a thin rectangular plate. Representation 71 from FIG. 11 illustrates, as a detail, the friction element of the ultrasonic actuators according to representations 68 to 70.

The ultrasonic motor according to representation 68 from FIG. 71 operates with the sum of two acoustic standing waves with the fundamental and the doubled frequency.

Figure 12:
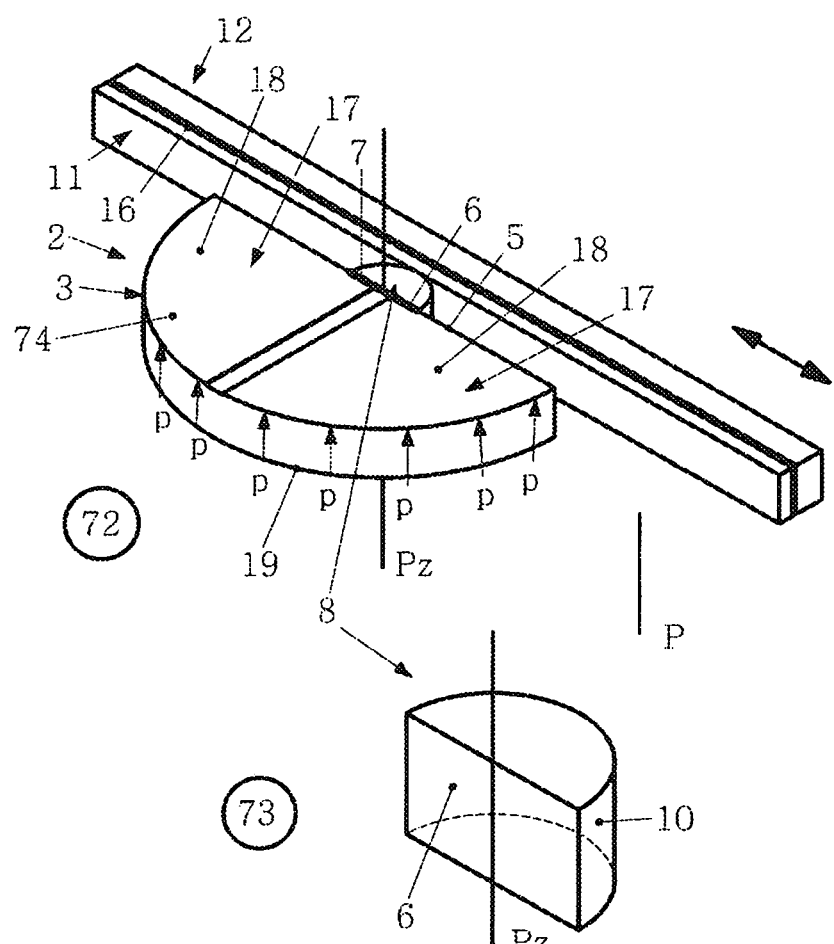
FIG. 12: Representation 72: embodiment of an ultrasonic motor; representation 73: friction element of the ultrasonic motor according to representation 72

The ultrasonic actuator of the ultrasonic motor according to representation 72 from FIG. 12 is constituted as part of a disc, whilst the friction element of the ultrasonic actuator represents a partial cylinder, which is shown as a detail in representation 73 from FIG. 12.

Figure 13:
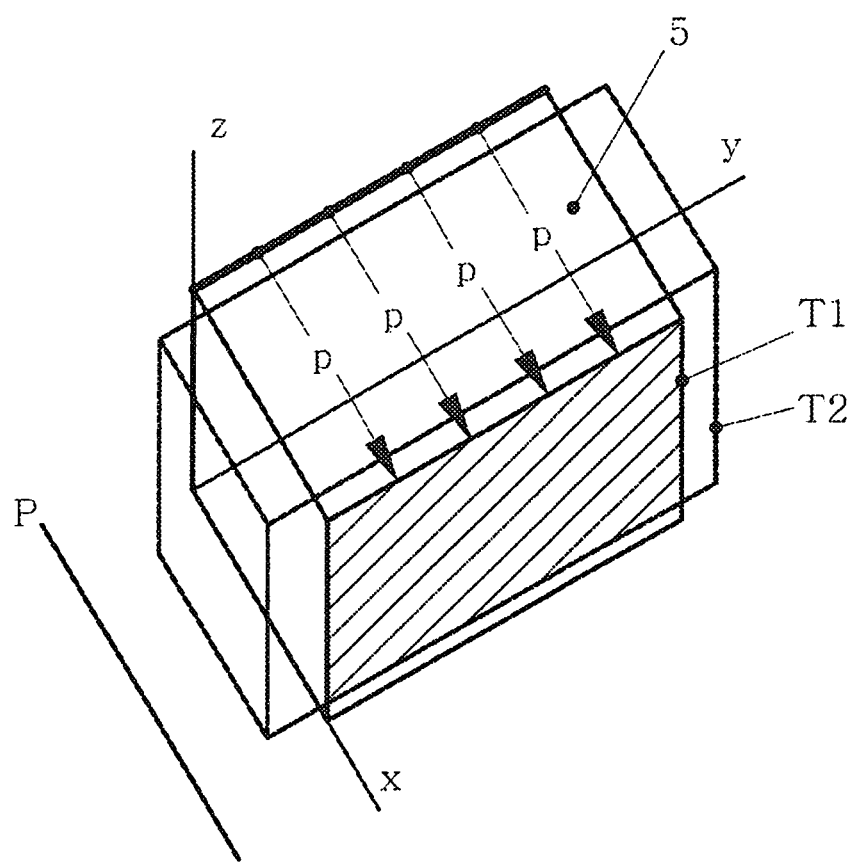
FIG. 13: Diagrammatic representation of the temperature-induced dimensional changes in the ultrasonic actuator

FIG. 13 shows an ultrasonic actuator in a rectangular shape produced from piezoelectric ceramic. The polarized piezoceramic used with the ultrasonic actuator according to the invention, for example lead-zirconate-titanate (PZT), has, in respect of the temperature expansion coefficient, an anisotropic material behaviour with a temperature expansion coefficient $\alpha_{\|}$ parallel to polarization axis P and a temperature expansion coefficient $\alpha_\perp$ differing therefrom and normal to polarization axis P, wherein $\alpha_{\|}$ is less than $\alpha_\perp$. Temperature expansion coefficient $\alpha_{\|}$ lies in a range from $-3$ to $5 \times 10\text{e}{-6}$ 1/K, whilst temperature expansion coefficient $a_\perp$ lies in a range from 3 to $7 \times 10\text{e}{-6}$ 1/K.

The ultrasonic actuator according to FIG. 13 is disposed in such a way that its edges coincide with coordinate axes x, y and z. It comprises electrodes 18 and 19 and is polarized normal to these electrodes. Vectors p indicate polarization axis P of the ultrasonic actuator coinciding with axis x. This means that polarization axis P of the ultrasonic actuator coincides with axis x.

The continuous lines in FIG. 13 represent the external dimensions of the ultrasonic actuator at a temperature T1, whilst the dashed lines represent its external dimensions at higher temperature T2.

On account of the differences between temperature expansion coefficients $\alpha_{\|}$ and $\alpha_\perp$, the ultrasonic actuator, when heated, expands less parallel to polarization axis P than in the direction normal to polarization axis P. In the case of a very marked anisotropic piezoceramic, the ultrasonic actuator can even be compressed parallel to polarization axis P when heated.

Figure 14:
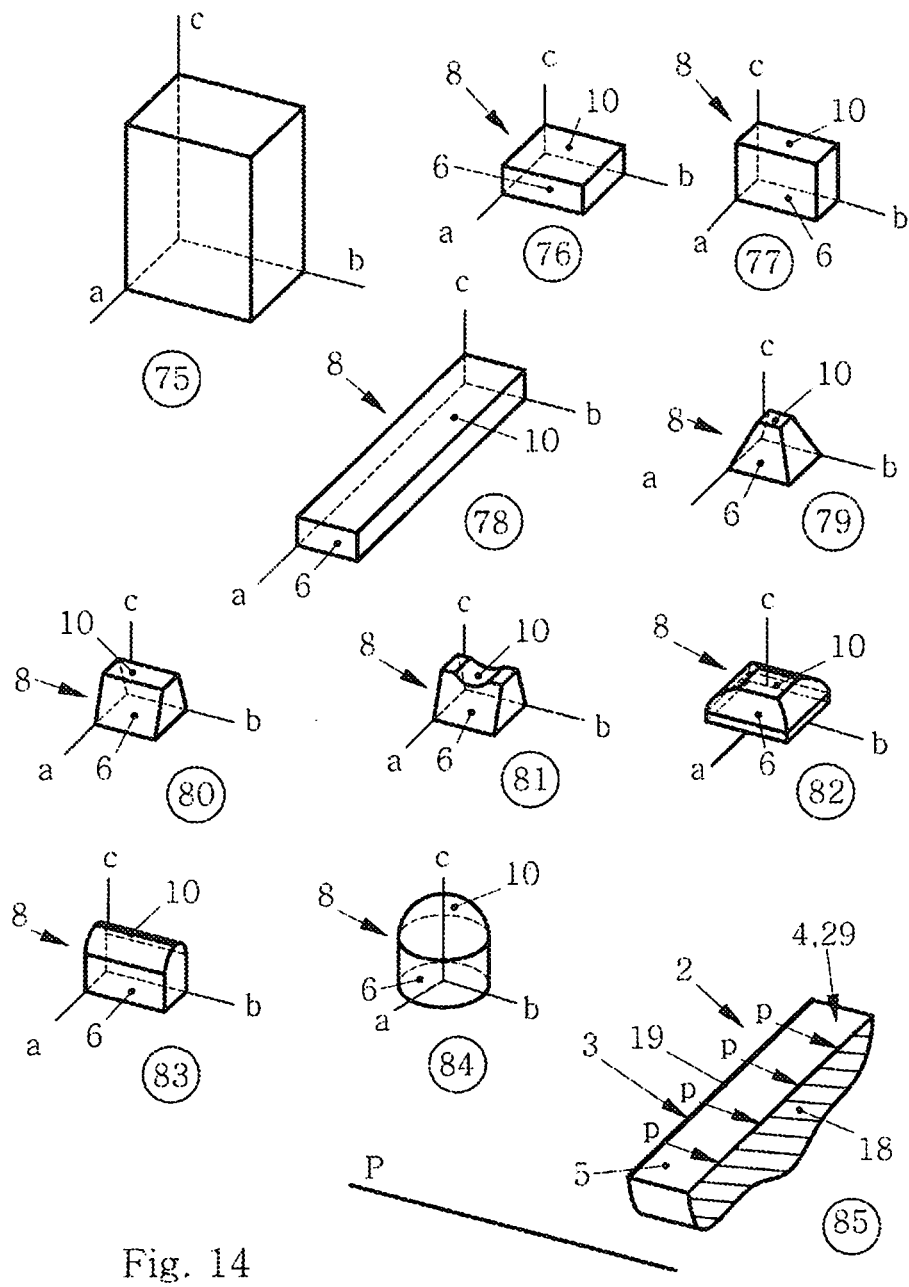
FIG. 14: Representations 75 to 84: different embodiments of a friction element made of yttrium aluminate; representation 85: section of an ultrasonic actuator with a surface for fitting a friction element according to representations 75 to 84

Representation 75 from FIG. 14 shows the elementary cell of a monocrystal with a rhombic crystalline form and the arrangement of its crystal axes a, b, c, whilst representations 76 to 84 from FIG. 14 show different embodiments of a friction element made of monocrystalline yttrium aluminate (YAlO$_3$). Yttrium aluminate has a rhombic crystalline form.

Different temperature expansion coefficients $\alpha_a$, $\alpha_b$ and $\alpha_c$ exist along or parallel to the three crystal axes a, b and c. Temperature expansion coefficient $\alpha_a$ along crystal axis a amounts to $9.5 \times 10\text{e}{-6}$ 1/K, temperature expansion coefficient $\alpha_b$ along crystal axis b amounts to $4.3 \times 10\text{e}{-6}$ 1/K, and temperature expansion coefficient $\alpha_c$ along crystal axis c amounts to $10.8 \times 10\text{e}{-6}$ 1/K. The hardness of this monocrystal amounts to 8.5 on the Mohs scale.

The smallest temperature expansion coefficient exists along axis b for yttrium aluminate, whilst the greatest temperature expansion coefficient exists along axis c. A temperature expansion coefficient lying between the two latter exists along the axis a. For another monocrystal with a rhombic crystalline structure, a distribution different from that described previously in respect of the temperature expansion coefficients may be present.

Representations 76 to 84 in FIG. 14 show different embodiments of friction elements 8 made of yttrium aluminate. In each case, their orientation is represented with respect to crystal axes a, b, c and the arrangement with respect to polarization axis P of a piezoelectric plate 4 or 29 according to representation 85.

Figures 15, 16:
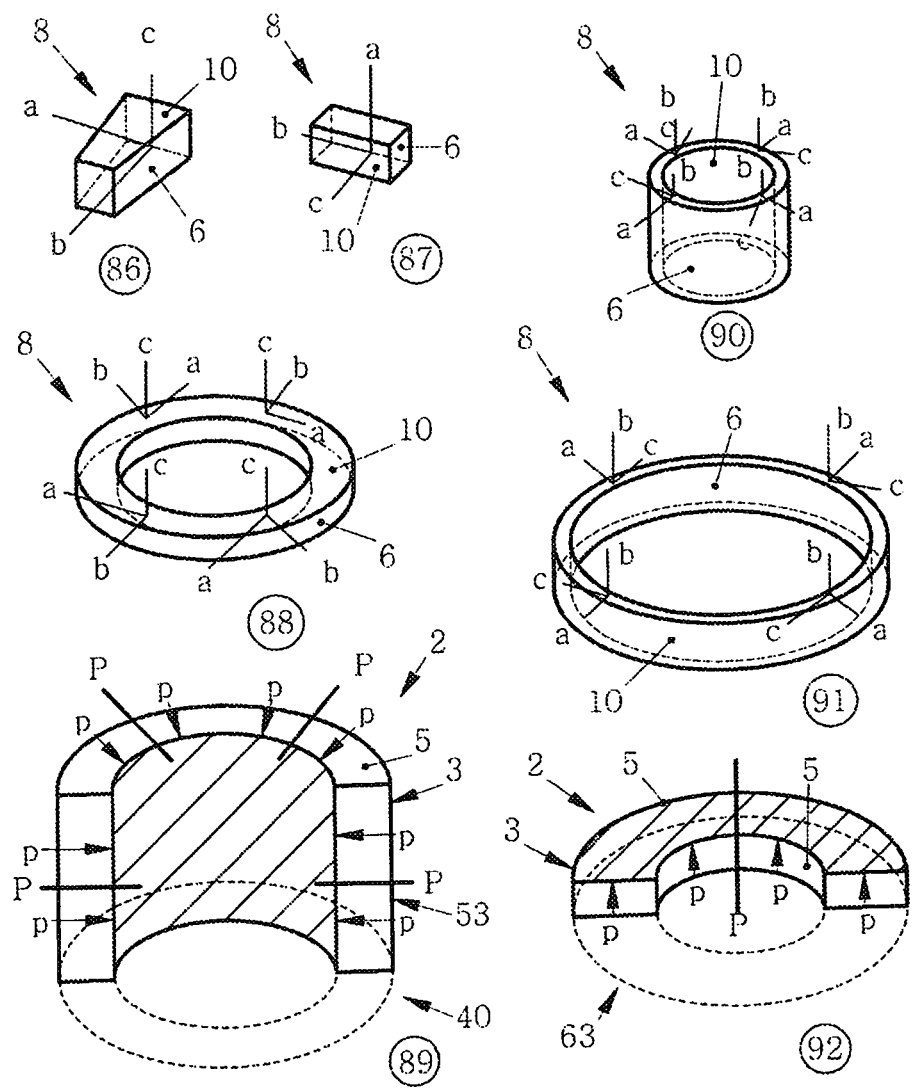
FIG. 15: Representations 86 to 88: different embodiments of a friction element made of yttrium aluminate; representation 89: section of an ultrasonic actuator with a surface for fitting a friction element according to representations 86 to 88
FIG. 16: Representations 90 and 91: different embodiments of a friction element made of yttrium aluminate; representation 92: section of an ultrasonic actuator with a surface for fitting a friction element according to representations 90 and 91

Representations 86 to 88 from FIG. 15 show a friction element made of yttrium aluminate in the form of a ring section (representation 86), a prism (representation 87) and a ring (representation 88) for an ultrasonic actuator in the form of a partial hollow cylinder according to representation 89 from FIG. 15.

Representations 90 and 91 from FIG. 16 show a friction element made of yttrium aluminate in the form of a cylinder (representation 90) or a ring (representation 91) for an ultrasonic actuator in the form of a disc according to representation 92 from FIG. 16.

Ring-shaped or cylindrical friction elements 8 shown in representations 88 from FIGS. 15 and 90 and 91 from FIG. 16 have a rotating system of crystal axes. Such friction elements can be produced from a melt of monocrystalline tubes drawn from yttrium aluminate, said melt being injected with seeds.

Apart from yttrium aluminate, friction elements 8 can also be made from another hard monocrystalline material with a rhombic crystalline structure. This includes, for example, the materials chrysoberyl ($BeAl_2O_4$) or topaz $Al_2SiO_4(F, OH)_2$ with a hardness of 9 and higher on the Mohs scale.

Figure 17:
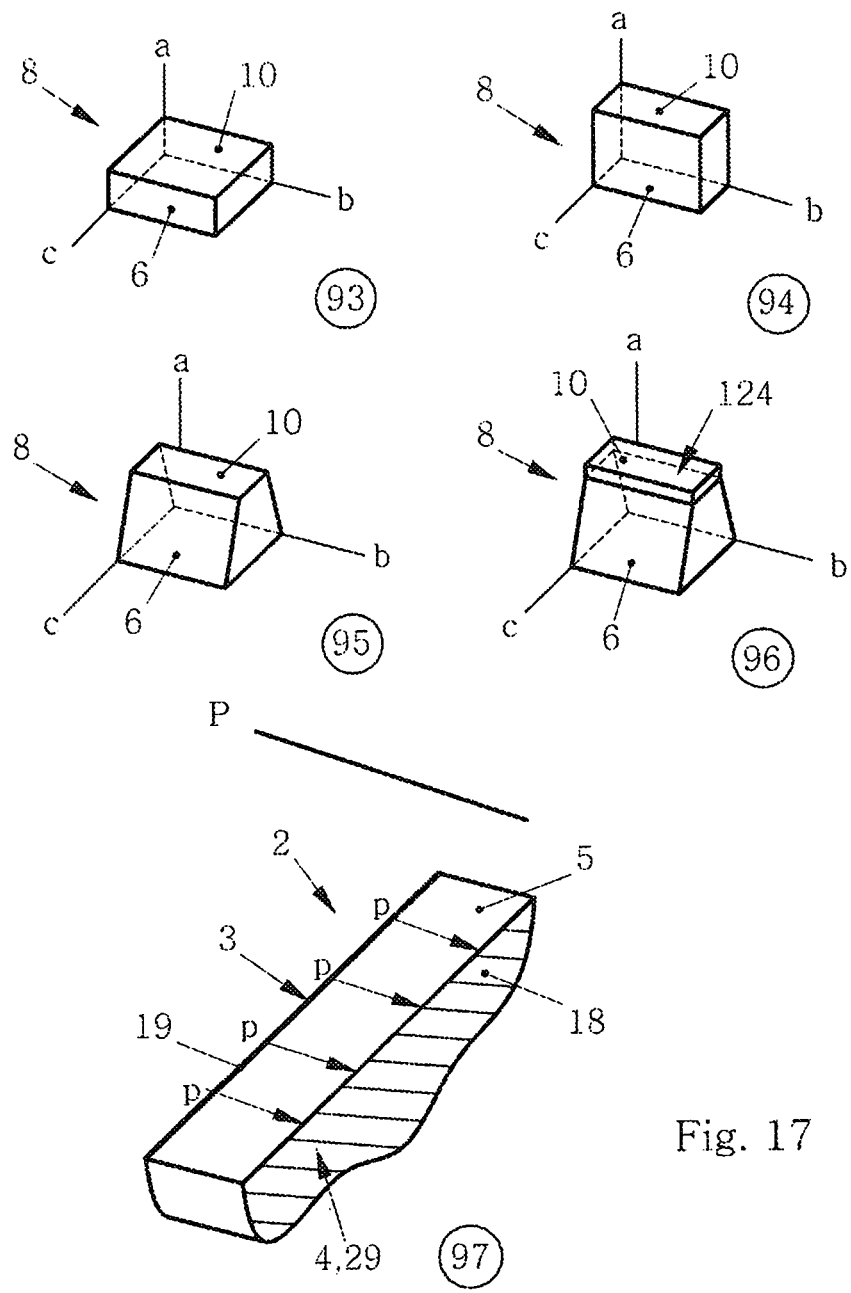
FIG. 17: Representations 93 to 96: embodiments of a friction element made of lithium triborate; representation 97: section of an ultrasonic actuator with a surface for fitting a friction element according to representations 93 to 96

Representations 93 to 96 from FIG. 17 show friction elements made of monocrystalline lithium triborate ($LiB_3O_5$) with a likewise rhombic crystalline structure and constituted in different ways. Lithium triborate has a very marked anisotropy of the temperature expansion coefficient with $\alpha_a = 10.8 \times 10e-6$ 1/K, $\alpha_b = -8.8 \times 10e-6$ 1/K and $\alpha_c = 3.4 \times 10e-6$ 1/K.

Friction element 8 is fashioned from the monocrystalline lithium triborate in such a way that crystal axis b runs parallel to polarization axis P of piezoelement 3 of the ultrasonic actuator 2. Furthermore, crystal axis c lies normal to polarization axis P, whilst axis a runs normal to surface 3 on which the friction element is disposed (see representation 97 in FIG. 17).

The monocrystalline lithium triborate has a hardness which has the value 6 on the Mohs scale. In cases of application in which this hardness is not sufficient, the friction element can also be provided at its surface with a thin, hard and abrasion-resistant layer 124 (see representation 96 from FIG. 17).

Friction elements 8 comprising or produced from monocrystals with a rhombic crystalline structure are connected to working surface 5 of ultrasonic actuator 3 in such a way that the crystal axis with the minimum temperature expansion coefficient (this is crystal axis b for yttrium aluminate) runs parallel to polarization axis P or $P_z$. The crystal axis with the maximum temperature expansion coefficient (this is axis a for yttrium aluminate) runs normal to polarization axis P or $P_z$.

As a result of this kind if axis orientation, the mechanical stresses arising in adhesive layer 7 parallel to polarization axis P during the cooling or heating of ultrasonic actuator 3 can be reduced markedly.

Figure 18:
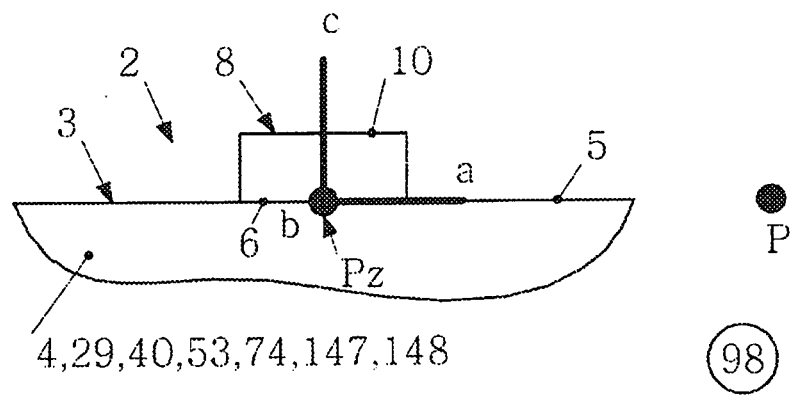
FIG. 18: Representations 98 to 100: different embodiments of a friction element made of yttrium aluminate for the ultrasonic actuator
Figure 18:
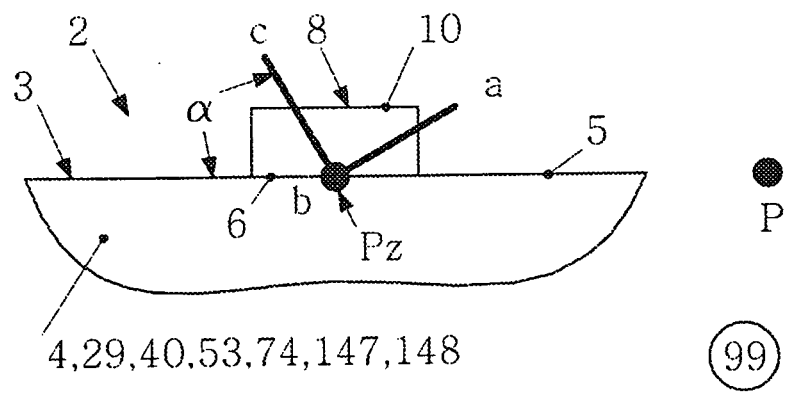
Figure 18:
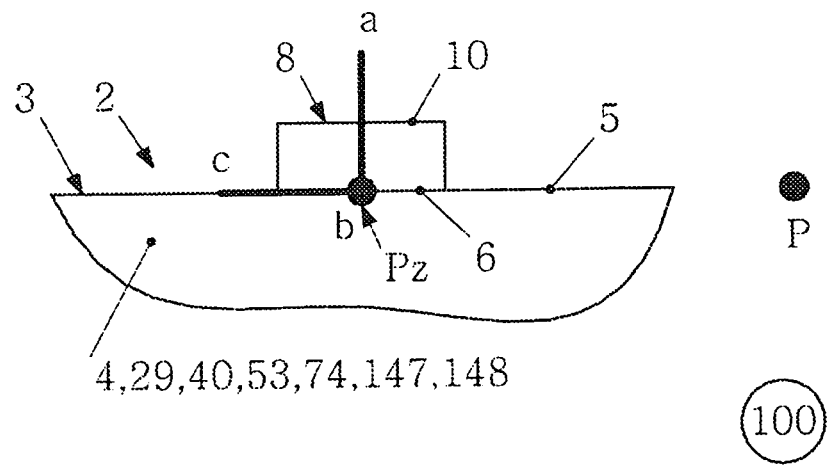

The axis of the temperature expansion coefficient of average magnitude (this is crystal axis c for yttrium aluminate) can run either normal to working face 5 (see representation 98 in FIG. 18), or inclined at an angle a to working face 5 (see representation 99 in FIG. 18) or parallel to working face 5 (see representation 100 in FIG. 18) of ultrasonic actuator 3. The angle of inclination of this axis determines the magnitude of the minimum mechanical stresses that arise in adhesive layer 7 normal to polarization axis P during heating and cooling of ultrasonic actuator 3.

In the case of the ultrasonic actuator according to the invention, the friction element disposed on the latter can also be made of a monocrystalline material with a hexagonal crystalline structure. Examples of this are the materials corundum, ruby, sapphire ($Al_2O_3$) or silicon carbide (SiC) with a hardness of 9 on the Mohs scale.

Figure 19:
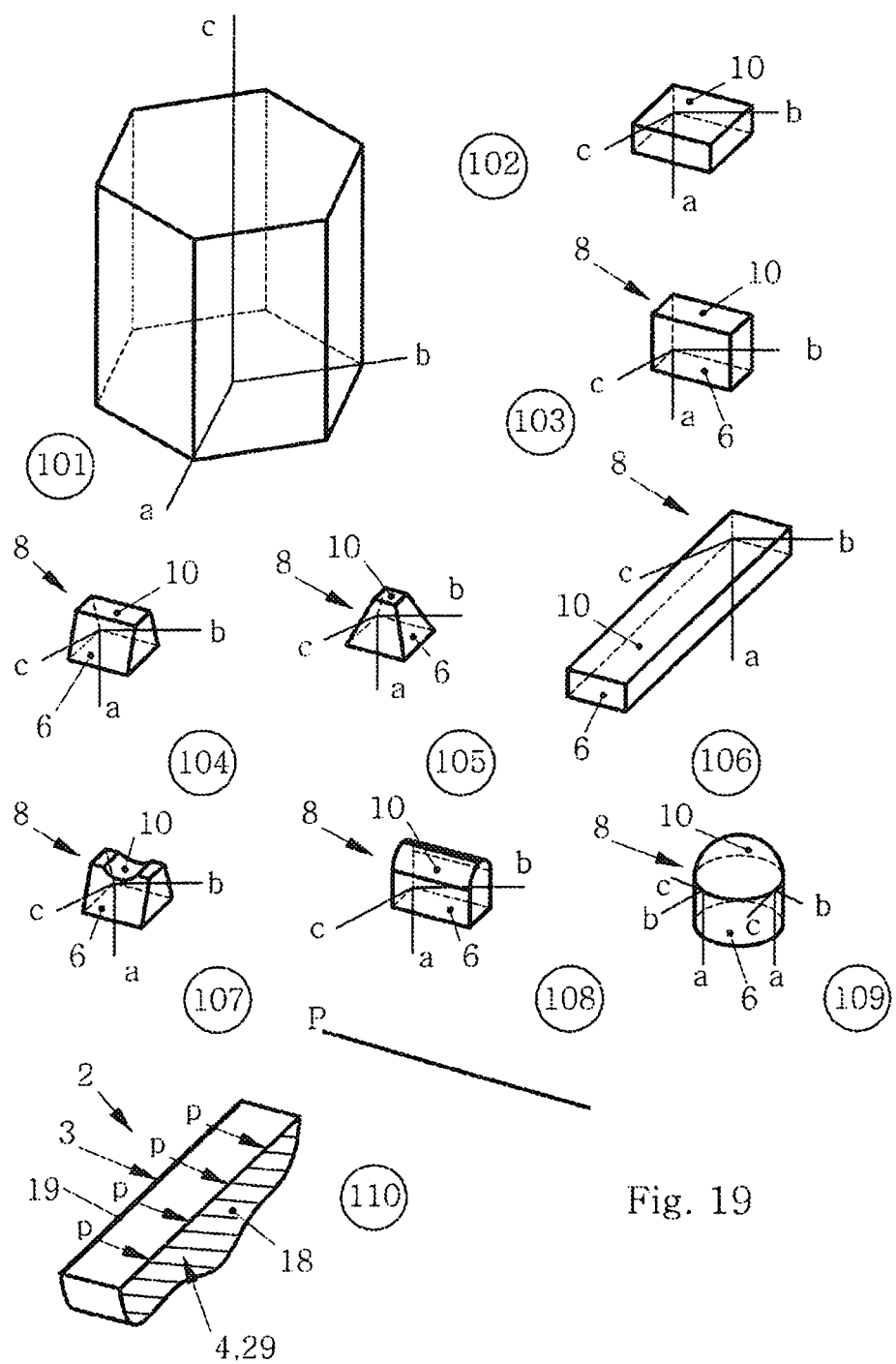
FIG. 19: Representation 101: elementary cell of a monocrystal of hexagonal crystalline structure; representations 102 to 109: embodiments of a friction element comprising a monocrystal of hexagonal crystalline structure; representation 110: section of an ultrasonic actuator with a surface for fitting a friction element according to representations 102 to 109

Representation 101 from FIG. 19 shows the structure of an elementary cell of a monocrystalline material with a hexagonal crystalline structure and the arrangement of its crystal axes a, b, c. Axes a and b run at an angle of 120° to one another and at an angle of 90° to axis c.

Monocrystalline materials with a hexagonal crystalline structure are characterized by two temperature expansion coefficients. One temperature expansion coefficient, i.e. $\alpha_{\parallel,c}$, runs parallel to crystal axis c. The second temperature expansion coefficient, $\alpha_{\perp,c}$, runs normal to crystal axis c and parallel to the plane formed by crystal axes a and b.

In the case of a monocrystalline material comprising corundum, ruby, sapphire, $\alpha_{\parallel,c}$ amounts to $6.2 \times 10e-6$ 1/K, and $\alpha_{\perp,c}$ amounts to $5.4 \times 10e-6$ 1/K, i.e. here, crystal axis c is the axis of the temperature expansion coefficient with the maximum magnitude, whilst the plane formed by crystal axes a and b represents the plane for the temperature expansion coefficient with the minimum magnitude.

Representations 102 to 109 from FIG. 19 show friction elements 8 constituted as prisms and produced from or comprising a monocrystalline material of hexagonal crystalline structure such as corundum, ruby or sapphire, the respective position or orientation of their crystal axes a, b and c and, with respect to representation 110 from FIG. 19, their orientation with respect to polarization axis P of the ultrasonic actuator.

Figures 20, 21:
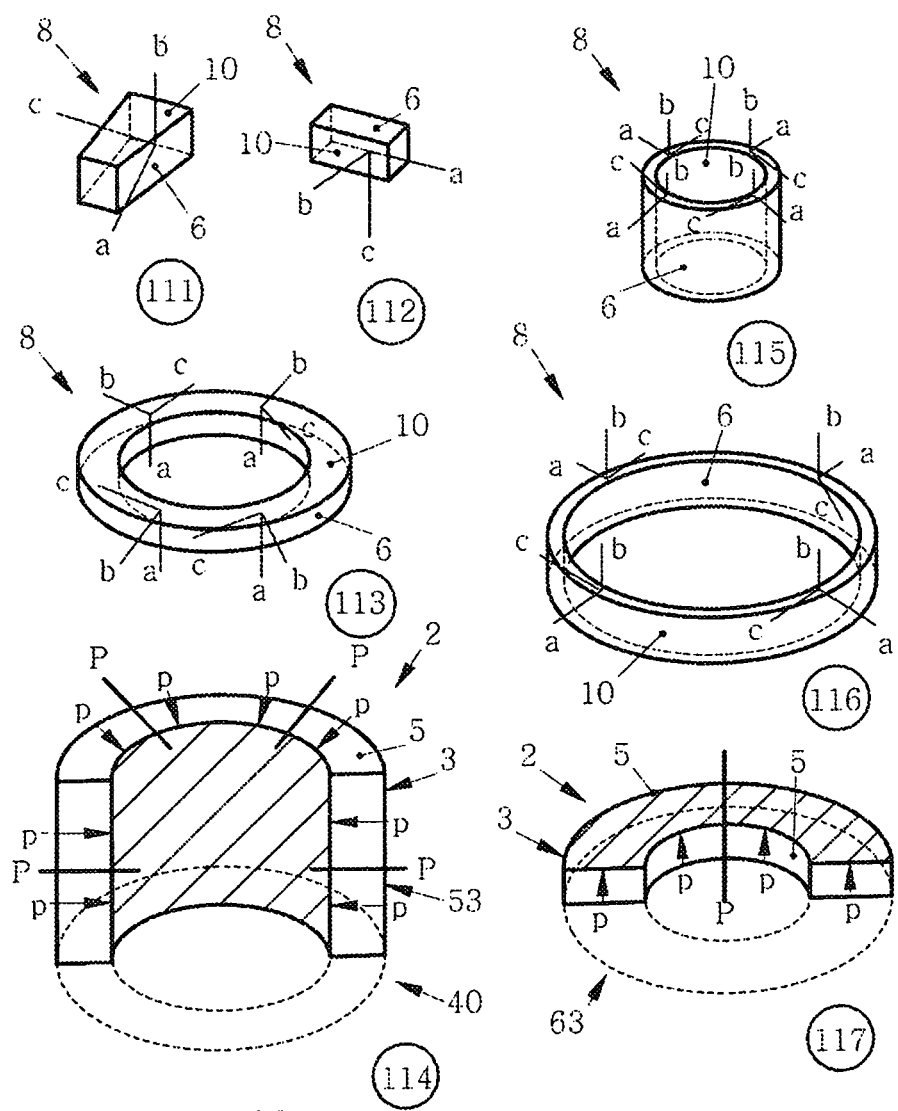
FIG. 20: Representations 111 to 113: different embodiments of a friction element comprising a monocrystal of hexagonal crystalline structure; representation 114: section of an ultrasonic actuator with a surface for fitting a friction element according to representations 111 to 113
FIG. 21: Representations 115 to 116: different embodiments of a friction element comprising a monocrystal of hexagonal crystalline structure; representation 117: section of an ultrasonic actuator with a surface for fitting a friction element according to representations 115 to 116

Representations 111 to 113 from FIG. 20 show a friction element made of monocrystalline corundum, ruby or sapphire in the form of a ring section (representation 111), a prism (representation 112) and a ring (representation 113) for an ultrasonic actuator in the form of a partial hollow cylinder according to representation 114 from FIG. 20.

Representations 115 and 116 from FIG. 21 show a friction elements made of monocrystalline corundum, ruby or sapphire in the form of a cylinder (representation 115) and a ring (representation 116) for an ultrasonic actuator in the form of a disc according to representation 117 from FIG. 21.

Friction elements 8 produced from a monocrystal with a hexagonal crystalline structure are disposed on working face 5 of piezoelement 3 in such a way that the plane of the temperature expansion coefficient with the minimum magnitude runs parallel to polarization axis P or $P_z$ and normal to working face 5 of ultrasonic actuator 3.

In the case of this crystal axis orientation, it is possible to reduce considerably the mechanical stresses in adhesive layer 7 parallel and normal to polarization axis P arising during cooling and heating of ultrasonic actuator 3.

Figure 22:
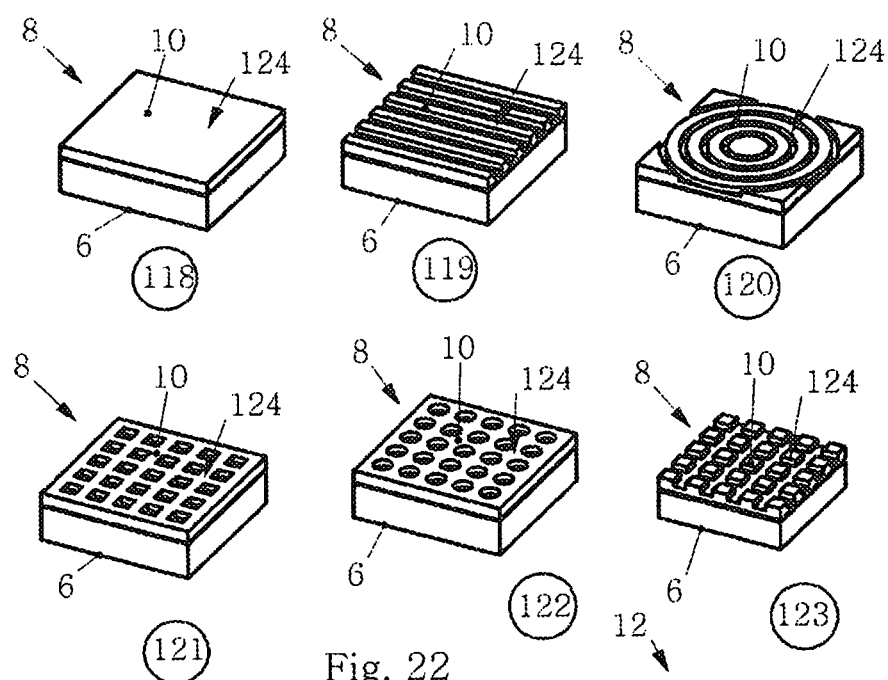
FIG. 22: Representations 118 to 123: different embodiments of friction elements provided with an abrasion-resistant external layer

Representations 118 to 123 in FIG. 22 show different embodiments of friction elements 8 which are provided with a thin abrasion-resistant layer 124.

Such a layer can be made of isotropic ceramic, sitall, glass or glass filled with hard particles.

Abrasion-resistant layer 124 of friction element 8 can be present as a monolithic structure as shown in representation 118 from FIG. 22, or in the form of straight (representation 119) or concentric or helical strips (representation 120), or can comprise a network structure (representations 121 and 122) or a structure as a field of dots with a square or other shape (representation 123).

Figure 23:
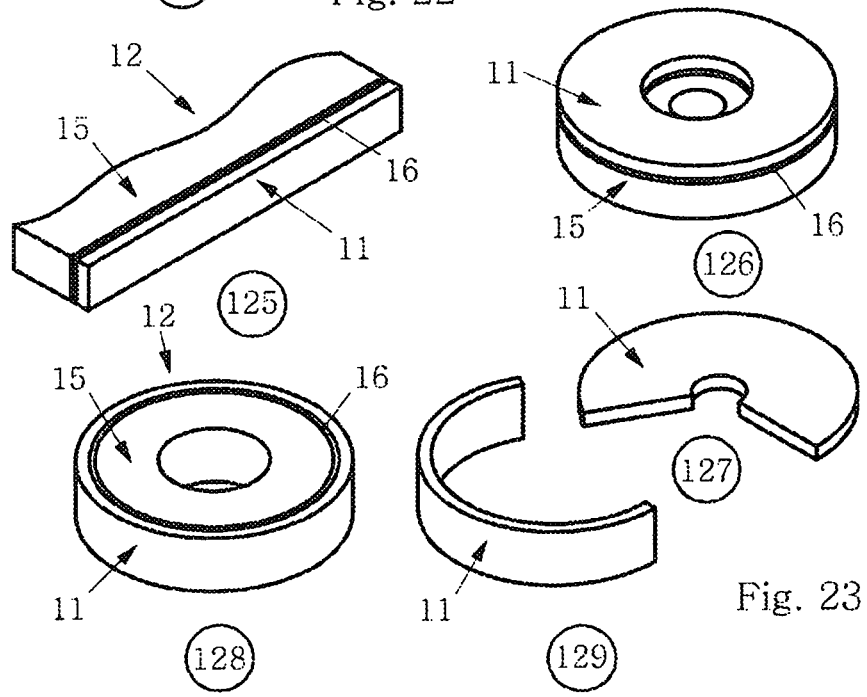
FIG. 23: Representations 125 to 129: different embodiments of a friction rail disposed on or capable of being disposed on an element to be driven

According to representations 125 to 129 from FIG. 23, friction rail 11 can be plate-shaped (representation 125), disc-shaped (representations 126 and 127) or ring-shaped (representations 128 and 129).

In order to reduce the abrasion, friction rail 11 is produced from a material whose hardness is of a similar degree to the hardness of friction element 8 or friction layer 124. As a material for this, use may be made of a monocrystalline material with a cubic crystalline structure such as for example a monocrystal of synthetic carbon, i.e. a monocrystal of a synthetic diamond.

Moreover, the friction rail can be made of a monocrystalline material with a cubic crystalline structure such as zirconium oxide ($ZrO_2$), spinell ($MgAl_2O_4$), yttrium aluminum granate ($Y_3Al_5O_{12}$) or boron nitride (β-BN).

Figure 24:
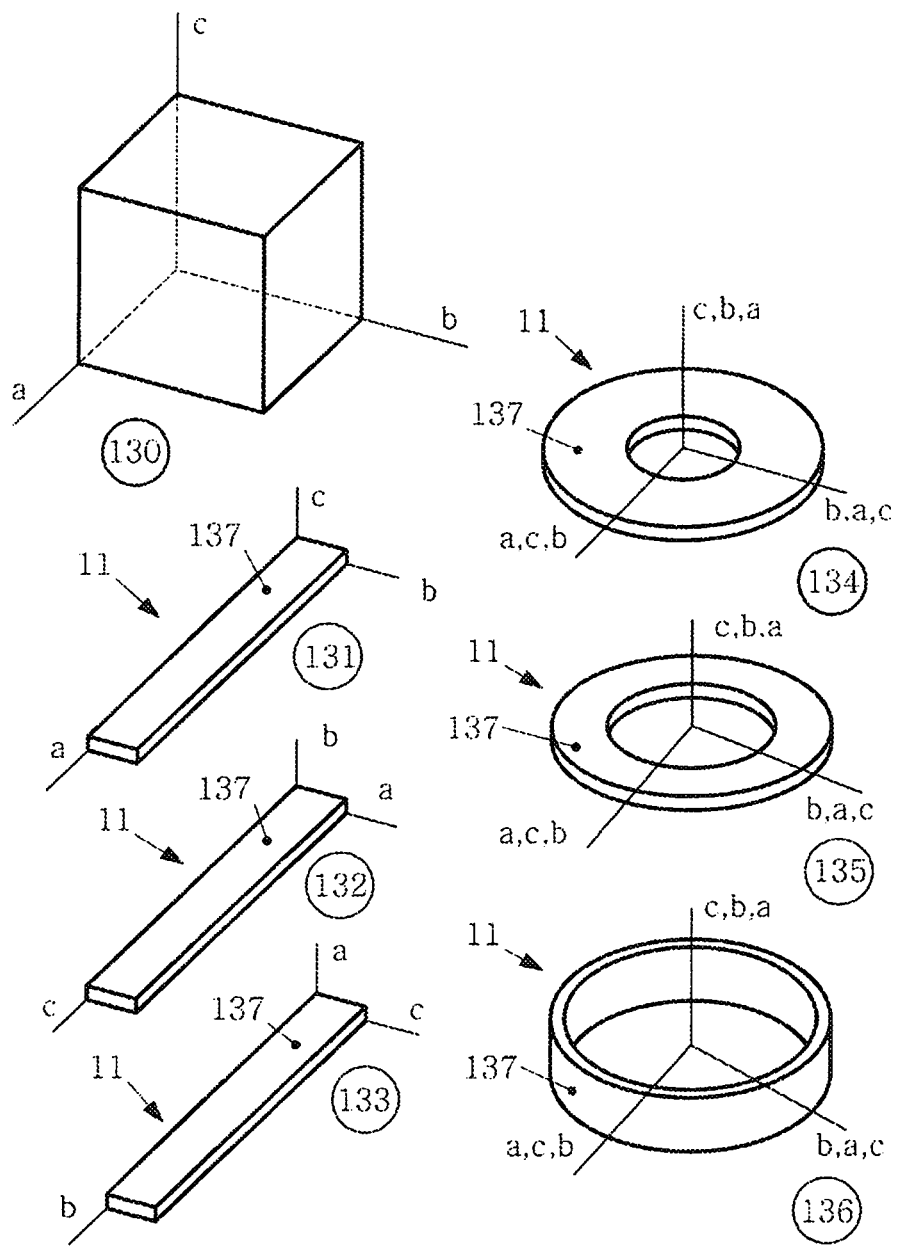
FIG. 24: Representation 130: elementary cell of a monocrystal with a cubic crystalline structure; representations 131 to 136: different embodiments of a friction rail comprising monocrystals of cubic crystalline structure

The elementary cell of a monocrystalline material of cubic crystalline structure is shown with the orientation of its crystal axes a, b, c in representation 130 from FIG. 24.

Representations 131 to 136 from FIG. 24 show different embodiments of friction rails 11 produced from monocrystalline material of cubic crystalline structure and their possible orientation relative to the crystal axes.

When use is made of a monocrystal of a synthetic diamond, crystal axis c runs normal to friction surface 137 of friction rail 11 or parallel to friction surface 137 of friction rail 11.

When use is made of monocrystals of cubic crystalline structure such as zirconium oxide ($ZrO_2$), spinell ($MgAl_2O_4$), yttrium aluminum granate ($Y_3Al_5O_{12}$) or boron nitride (β-BN), crystal axis or crystal axis b or crystal axis c of the monocrystal runs normal to friction surface 137 of friction rail 11.

Moreover, friction rail 11 can be made of a monocrystalline material with a hexagonal crystalline structure such as for example corundum, ruby or sapphire ($Al_2O_3$).

Figure 25:
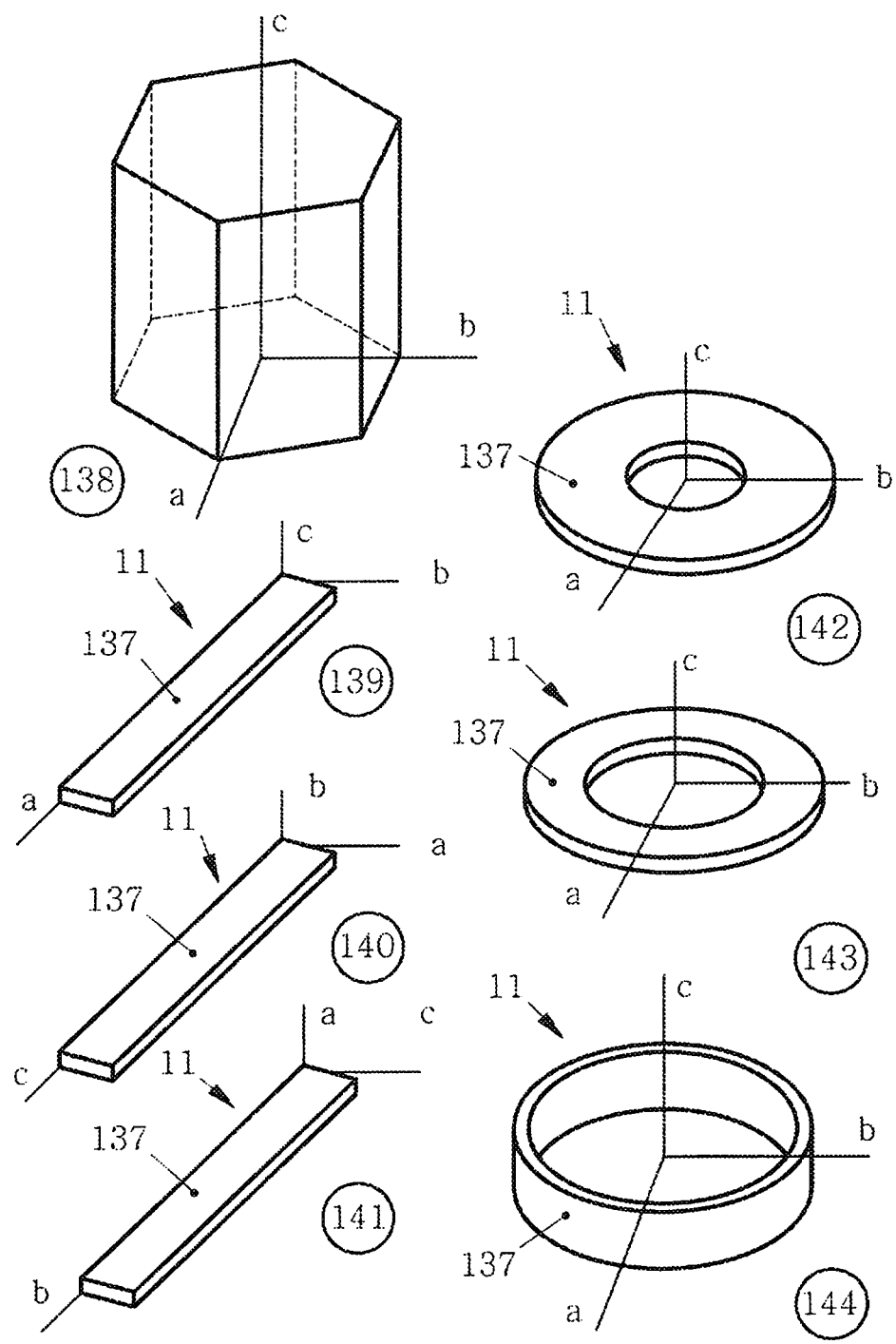
FIG. 25: Representation 138: elementary cell of a monocrystal with a hexagonal crystalline structure; representations 139 to 144: different embodiments of a friction rail comprising monocrystals of hexagonal crystalline structure

Representation 138 from FIG. 25 shows the elementary cell of a monocrystal with a hexagonal crystalline structure and the orientation of its crystal axes a, b, c.

Representations 139 to 144 from FIG. 25 show different embodiment variants of friction rails 11 produced from monocrystals with a hexagonal crystalline structure and their possible orientation with respect to crystal axes a, b, c of the monocrystal with a hexagonal crystalline structure.

Friction rail 11 can also be made of oxide ceramic comprising 75 to 95 wt.-% aluminum oxide ($Al_2O_3$) and 25 to 5 wt.-% zirconium oxide ($ZrO_2$).

Friction rail 11 can also be made of SiAlON ceramic, comprising 40 to 90 wt.-% silicon nitride ($Si_3N_4$) and 60 to 10 wt.-% aluminum oxide ($Al_2O_3$).

Moreover, friction rail 11 can comprise or be made of a ceramic such as for example silicon carbide (SiC) or aluminum nitride (AlN). Furthermore, the friction rail can comprise or be made of a metal ceramic such as tungsten carbide (WC) or a mixture of tungsten carbide (WC) and titanium carbide (TiC).

Figure 26:
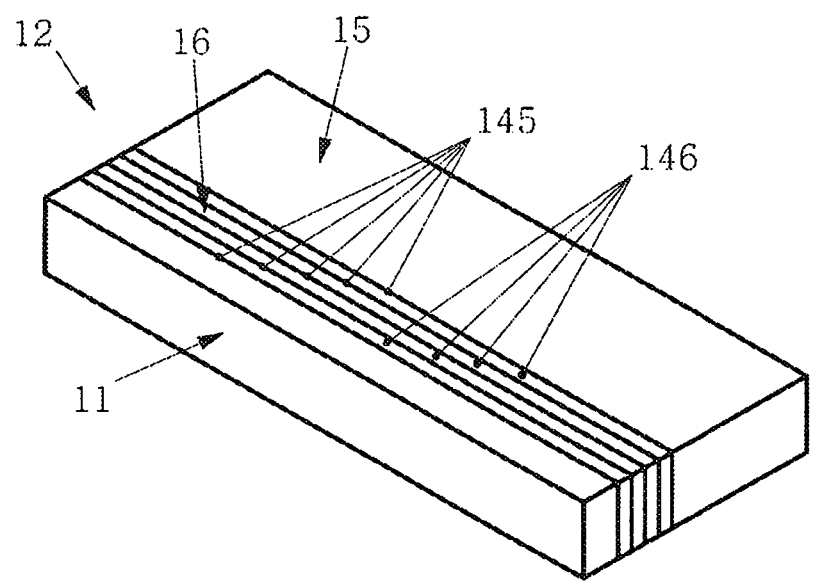
FIG. 26: Embodiment of an element of the ultrasonic motor to be driven

FIG. 26 shows an element 12 to be driven, wherein sound-insulating layer 16 is constituted by alternating viscous layers 145 and tenacious layers 146.

The ultrasonic actuator according to the invention enables an optimum adaptation of its temperature expansion coefficient to that of the friction element disposed on it. The initial mechanical stresses arising inside the adhesive layer on account of the bonding of the friction element with the ultrasonic actuator are thus considerably reduced.

The reduction of the initial mechanical stresses permits an operation of the ultrasonic motor with a much higher mechanical load.

The convergence of the temperature expansion coefficients of the ultrasonic motor and of the friction element disposed on it also enables a marked increase in the setting temperature of the adhesive used to bond the friction element with the piezoelement. Setting temperatures of up to 250° C. can thus be achieved.

On account of the increased setting temperatures, the maximum operating temperature of the ultrasonic motor also lies higher during operation with the maximum mechanical load, whilst the minimum operating temperature at the same time lies lower. A much broader operating temperature range thus results for the ultrasonic actuator and for an ultrasonic motor with one such ultrasonic actuator.

The previously described reduction in the initial mechanical stresses also makes it possible to increase the maximum oscillation speed of the ultrasonic actuator and thus to increase the maximum speed of the element of the ultrasonic motor to be driven. Furthermore, the maximum power developed by the ultrasonic actuator and the ultrasonic motor is increased.

Finally, the operational reliability of the ultrasonic actuator and of the corresponding ultrasonic motor is increased on account of the reduction in the initial mechanical stresses.

The invention claimed is:

1. An ultrasonic actuator made of piezoelectric ceramic with a polarization axis P, wherein the ultrasonic actuator has a temperature expansion coefficient $\alpha\text{II}$ parallel to polarization axis P, which differs from a temperature expansion coefficient $\alpha\perp$ normal to polarization axis P, and at least one friction element is disposed on the ultrasonic actuator, characterized in that the friction element is made of an anisotropic monocrystal with different temperature expansion coefficients along the three crystal axes a, b and c, wherein the temperature expansion coefficient is least along a first of the three crystal axes and the temperature expansion coefficient is greatest along a second of the three crystal axes, and the friction element is orientated with respect to the ultrasonic actuator in such a way that the first crystal axis is disposed parallel to polarization axis P of the ultrasonic actuator and the second crystal axis is disposed normal to polarization axis P of the ultrasonic actuator.

2. The ultrasonic actuator according to claim 1, characterized in that the monocrystal of the friction element has a rhombic crystalline structure and is preferably made of yttrium aluminate ($YAlO_3$), chrysoberyl ($BeAl_2O_4$) or topaz $Al_2SiO_4(F,OH)_2$.

3. The ultrasonic actuator according to claim 1, characterized in that crystal axis b of the friction element is orientated parallel to polarization axis P of the ultrasonic actuator, and crystal axis c of the friction element is orientated normal to the surface of the ultrasonic actuator on which the friction element is disposed.

4. The ultrasonic actuator according to claim 1, characterized in that the friction element is made of lithium triborate ($LiB_3O_5$).

5. The ultrasonic actuator according to claim 4, characterized in that crystal axis b of the friction element is orientated parallel to polarization axis P of the ultrasonic actuator and crystal axis c of the friction element is orientated normal to polarization axis P of the ultrasonic actuator, whilst crystal axis a is orientated normal to the surface of the ultrasonic actuator on which the friction element is disposed.

6. The ultrasonic actuator according to claim 1, characterized in that the monocrystal of the friction element has a hexagonal crystalline structure and is preferably made of corundum, ruby, sapphire ($Al_2O_3$) or silicon carbide (SiC).

7. The ultrasonic actuator according to claim 6, characterized in that crystal axis c of the friction element is orientated normal to polarization axis P of the ultrasonic actuator and the plane formed by the two other crystal axes a and b is orientated normal to the surface of the ultrasonic actuator on which the friction element is disposed.

8. The ultrasonic actuator according to claim 1, characterized in that the friction element is provided with a thin hard abrasion-resistant external layer, preferably made of isotropic ceramic, sitall, glass or glass filled with hard metal particles.

9. The ultrasonic actuator according to claim 8, characterized in that the abrasion-resistant external layer of the friction element has a monolithic structure or a structure in the form of straight or concentric or helical strips or a network structure or a structure in the form of a field of dots with a square or other shape.

10. The ultrasonic actuator according to claim 1, characterized in that the friction element is connected to the ultrasonic actuator by means of an organic adhesive or a low-temperature glass.

11. An ultrasonic motor with an ultrasonic actuator according to claim 1 and an element to be driven by the ultrasonic actuator.

12. The ultrasonic motor according to claim 11, characterized in that the element to be driven comprises a friction rail, with which the friction element of the ultrasonic actuator is in an operative connection.

13. The ultrasonic motor according to claim 12, characterized in that the friction rail is made of a synthetic monocrystal of carbon of cubic crystalline structure, wherein crystal axis c of the monocrystal is disposed normal or parallel to the surface of the friction rail.

14. The ultrasonic motor according to claim 12, characterized in that the friction rail is made of a carbon monocrystal of cubic crystalline structure, preferably comprising zirconium oxide ($ZrO_2$), spinell ($MgAl_2O_4$), yttrium aluminium granate ($Y_3Al_5O_{12}$) or boron nitride ($\beta$-BN), wherein crystal axis a or crystal axis b or crystal axis c of the monocrystal is orientated normal to the surface of the friction rail.

15. The ultrasonic motor according to claim 12, characterized in that the friction rail is made of a monocrystal of hexagonal crystalline structure, preferably comprising corundum, ruby or sapphire ($Al_2O_3$), wherein crystal axis c of the monocrystal is orientated normal or parallel to the surface of the friction rail.

* * * * *